(12) United States Patent
Bowers et al.

(10) Patent No.: US 8,185,940 B2
(45) Date of Patent: *May 22, 2012

(54) SYSTEM AND METHOD FOR PROVIDING DISCRIMINATED CONTENT TO NETWORK USERS

(75) Inventors: Theodore J Bowers, Wilmington, DE (US); Dean Ilijasic, Wilmington, DE (US); Shelley F. Sanders, Landenberg, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 996 days.

This patent is subject to a terminal disclaimer.

(21) Appl. No.: 11/778,958

(22) Filed: Jul. 17, 2007

(65) Prior Publication Data

US 2008/0016180 A1 Jan. 17, 2008

Related U.S. Application Data

(63) Continuation of application No. 09/902,612, filed on Jul. 12, 2001, now Pat. No. 7,266,839.

(51) Int. Cl.
*H04L 29/06* (2006.01)

(52) U.S. Cl. ............... 726/8; 713/155; 713/182; 705/50; 709/229

(58) Field of Classification Search ...... 726/8; 713/155, 713/182; 705/50; 709/229
See application file for complete search history.

(56) References Cited

U.S. PATENT DOCUMENTS

| | | | |
|---|---|---|---|
| 2,405,500 A | 8/1946 | Guanella | |
| 3,665,162 A | 5/1972 | Yamamoto et al. | |
| 3,705,385 A | 12/1972 | Batz | |
| 3,860,870 A | 1/1975 | Furuya | |
| 3,896,266 A | 7/1975 | Waterbury | |
| 3,938,090 A | 2/1976 | Borison et al. | |
| 3,938,091 A | 2/1976 | Atalla et al. | |
| 4,013,962 A | 3/1977 | Beseke et al. | |
| 4,123,747 A | 10/1978 | Lancto et al. | |
| 4,160,120 A | 7/1979 | Barnes et al. | |

(Continued)

FOREIGN PATENT DOCUMENTS

CA 2430549 6/2002

(Continued)

OTHER PUBLICATIONS

Kutler, A Different Drummer on the Data Highway, American Banker, Section: No. 91, vol. 160, May 12, 1995, p. 14.

(Continued)

*Primary Examiner* — Michael Pyzocha
(74) *Attorney, Agent, or Firm* — Hunton & Williams LLP

(57) ABSTRACT

The present invention provides methods and systems for providing discriminated partner system resources to the user of a host system. A host entity has a business relationship with one or more partnered entities. A user accesses the host's system and then uses the host's system to connect to a partner's system. Access from one system to the next is seamless and requires no additional user input to verify the user's access rights to subsequently accessed partners' systems. The content delivered to the user from a partner's system is discriminated from a larger pool of information to appear consistent in appearance, message, or both with the host system. The host system, the partner system or both systems may perform the discrimination functions. The user is thereby provided with seamless access to partnered systems that reflects the business partnership of the host and various partners.

24 Claims, 4 Drawing Sheets

U.S. PATENT DOCUMENTS

| | | | |
|---|---|---|---|
| 4,200,770 | A | 4/1980 | Hellman et al. |
| 4,223,403 | A | 9/1980 | Konheim et al. |
| 4,249,180 | A | 2/1981 | Eberle et al. |
| 4,255,811 | A | 3/1981 | Adler |
| 4,302,810 | A | 11/1981 | Bouricius et al. |
| 4,316,055 | A | 2/1982 | Feistel |
| 4,319,336 | A | 3/1982 | Andersen et al. |
| 4,321,672 | A | 3/1982 | Braun et al. |
| 4,405,829 | A | 9/1983 | Rivest et al. |
| 4,453,074 | A | 6/1984 | Weinstein |
| 4,454,414 | A | 6/1984 | Benton |
| 4,471,164 | A | 9/1984 | Henry |
| 4,523,087 | A | 6/1985 | Benton |
| 4,529,870 | A | 7/1985 | Chaum |
| 4,567,359 | A | 1/1986 | Lockwood |
| 4,575,621 | A | 3/1986 | Dreifus |
| 4,605,820 | A | 8/1986 | Campbell, Jr. |
| 4,605,844 | A | 8/1986 | Haggan |
| 4,614,861 | A | 9/1986 | Pavlov et al. |
| 4,633,397 | A | 12/1986 | Macco |
| 4,641,239 | A | 2/1987 | Takesako |
| 4,650,981 | A | 3/1987 | Foletta |
| 4,661,658 | A | 4/1987 | Matyas |
| 4,663,500 | A | 5/1987 | Okamoto et al. |
| 4,695,880 | A | 9/1987 | Johnson et al. |
| 4,696,491 | A | 9/1987 | Stenger |
| 4,697,072 | A | 9/1987 | Kawana |
| 4,701,601 | A | 10/1987 | Francini et al. |
| 4,713,760 | A | 12/1987 | Yamada et al. |
| 4,713,761 | A | 12/1987 | Sharpe et al. |
| 4,723,246 | A | 2/1988 | Weldon, Jr. |
| 4,725,719 | A | 2/1988 | Oncken et al. |
| 4,745,468 | A | 5/1988 | Von Kohorn |
| 4,747,050 | A | 5/1988 | Brachtl et al. |
| 4,747,139 | A | 5/1988 | Taaffe |
| 4,752,676 | A | 6/1988 | Leonard et al. |
| 4,799,156 | A | 1/1989 | Shavit |
| 4,801,787 | A | 1/1989 | Suzuki |
| 4,823,264 | A | 4/1989 | Deming |
| 4,845,347 | A | 7/1989 | McCrindle |
| 4,859,837 | A | 8/1989 | Halpern |
| 4,868,877 | A | 9/1989 | Fischer |
| 4,877,947 | A | 10/1989 | Mori et al. |
| 4,882,675 | A | 11/1989 | Nichtberger et al. |
| 4,890,324 | A | 12/1989 | Jansen |
| 4,891,503 | A | 1/1990 | Jewell |
| 4,926,255 | A | 5/1990 | Von Kohorn |
| 4,941,090 | A | 7/1990 | McCarthy |
| 4,964,043 | A | 10/1990 | Galvin |
| 4,965,568 | A | 10/1990 | Atalla et al. |
| 4,977,501 | A | 12/1990 | Lefevre |
| 4,980,913 | A | 12/1990 | Skret |
| 4,984,272 | A | 1/1991 | McIlroy et al. |
| 4,992,940 | A | 2/1991 | Dworkin |
| 5,001,755 | A | 3/1991 | Skret |
| 5,005,200 | A | 4/1991 | Fischer |
| 5,016,270 | A | 5/1991 | Katz |
| 5,016,274 | A | 5/1991 | Micali et al. |
| 5,018,196 | A | 5/1991 | Takaragi et al. |
| 5,023,782 | A | 6/1991 | Lutz et al. |
| 5,025,372 | A | 6/1991 | Burton et al. |
| 5,050,207 | A | 9/1991 | Hitchcock |
| 5,054,067 | A | 10/1991 | Moroney et al. |
| 5,056,019 | A | 10/1991 | Schultz et al. |
| 5,072,380 | A | 12/1991 | Randelman et al. |
| 5,084,816 | A | 1/1992 | Boese |
| 5,097,115 | A | 3/1992 | Ogasawara et al. |
| 5,117,355 | A | 5/1992 | McCarthy |
| 5,122,950 | A | 6/1992 | Mee et al. |
| 5,157,717 | A | 10/1992 | Hitchcock |
| 5,161,244 | A | 11/1992 | Maurer |
| 5,163,098 | A | 11/1992 | Dahbura |
| 5,175,682 | A | 12/1992 | Higashiyama |
| 5,189,606 | A | 2/1993 | Burns et al. |
| 5,196,840 | A | 3/1993 | Leith et al. |
| 5,202,826 | A | 4/1993 | McCarthy |
| 5,212,792 | A | 5/1993 | Gerety et al. |
| 5,220,501 | A | 6/1993 | Lawlor |
| 5,225,664 | A | 7/1993 | Iijima |
| 5,231,569 | A | 7/1993 | Myatt et al. |
| 5,231,668 | A | 7/1993 | Kravitz |
| 5,233,654 | A | 8/1993 | Harvey et al. |
| 5,235,509 | A | 8/1993 | Mueller et al. |
| 5,237,620 | A | 8/1993 | Deaton |
| 5,241,594 | A | 8/1993 | Kung |
| 5,253,294 | A | 10/1993 | Maurer |
| 5,257,486 | A | 11/1993 | Holmwall |
| 5,265,008 | A | 11/1993 | Benton et al. |
| 5,265,033 | A | 11/1993 | Vajk |
| 5,267,314 | A | 11/1993 | Stambler |
| 5,276,311 | A | 1/1994 | Hennige |
| 5,287,268 | A | 2/1994 | McCarthy |
| 5,297,026 | A | 3/1994 | Hoffman |
| 5,302,810 | A | 4/1994 | Gauthier et al. |
| 5,305,456 | A | 4/1994 | Boitana |
| 5,311,594 | A | 5/1994 | Penzias |
| 5,315,504 | A | 5/1994 | Lembie |
| 5,317,683 | A | 5/1994 | Hager et al. |
| 5,319,710 | A | 6/1994 | Atalla et al. |
| 5,321,841 | A | 6/1994 | East |
| 5,341,428 | A | 8/1994 | Schatz |
| 5,351,186 | A | 9/1994 | Bullock |
| 5,351,187 | A | 9/1994 | Hassett |
| 5,352,877 | A | 10/1994 | Morley |
| 5,367,572 | A | 11/1994 | Weiss |
| 5,381,332 | A | 1/1995 | Wood |
| 5,382,784 | A | 1/1995 | Eberhardt |
| 5,412,708 | A | 5/1995 | Katz |
| 5,412,730 | A | 5/1995 | Jones |
| 5,420,405 | A | 5/1995 | Chasek |
| 5,428,684 | A | 6/1995 | Akiyama et al. |
| 5,430,644 | A | 7/1995 | Deaton et al. |
| 5,432,326 | A | 7/1995 | Noblett et al. |
| 5,446,740 | A | 8/1995 | Yien |
| 5,448,471 | A | 9/1995 | Deaton et al. |
| 5,450,134 | A | 9/1995 | Legate |
| 5,450,491 | A | 9/1995 | McNair |
| 5,450,537 | A | 9/1995 | Hirai et al. |
| 5,465,206 | A | 11/1995 | Hilt et al. |
| 5,466,920 | A | 11/1995 | Nair et al. |
| 5,467,269 | A | 11/1995 | Flaten |
| 5,469,576 | A | 11/1995 | Dauerer et al. |
| 5,473,143 | A | 12/1995 | Vak |
| 5,473,732 | A | 12/1995 | Change |
| 5,479,530 | A | 12/1995 | Nair et al. |
| 5,483,444 | A | 1/1996 | Heintzeman et al. |
| 5,485,370 | A | 1/1996 | Moss et al. |
| 5,495,981 | A | 3/1996 | Warther |
| 5,500,890 | A | 3/1996 | Rogge et al. |
| 5,502,636 | A | 3/1996 | Clarke |
| 5,511,117 | A | 4/1996 | Zazzera |
| 5,513,102 | A | 4/1996 | Auriemma |
| 5,524,073 | A | 6/1996 | Stambler |
| 5,532,689 | A | 7/1996 | Bueno |
| 5,532,920 | A | 7/1996 | Hartrick |
| 5,534,855 | A | 7/1996 | Shockley et al. |
| 5,537,314 | A | 7/1996 | Kanter |
| 5,537,473 | A | 7/1996 | Saward |
| 5,539,825 | A | 7/1996 | Akiyama et al. |
| 5,541,583 | A | 7/1996 | Mandelbaum |
| 5,544,086 | A | 8/1996 | Davis et al. |
| 5,546,452 | A | 8/1996 | Andrews |
| 5,550,734 | A | 8/1996 | Tater |
| 5,551,021 | A | 8/1996 | Harada |
| 5,555,303 | A | 9/1996 | Stambler |
| 5,557,334 | A | 9/1996 | Legate |
| 5,557,518 | A | 9/1996 | Rosen |
| 5,560,008 | A | 9/1996 | Johnson et al. |
| 5,568,489 | A | 10/1996 | Yien |
| 5,570,295 | A | 10/1996 | Isenberg |
| 5,570,465 | A | 10/1996 | Tsakanikas |
| 5,576,951 | A | 11/1996 | Lockwood |
| 5,583,778 | A | 12/1996 | Wind |
| 5,583,933 | A | 12/1996 | Mark |
| 5,590,038 | A | 12/1996 | Pitroda |
| 5,590,197 | A | 12/1996 | Chen |
| 5,590,199 | A | 12/1996 | Krajewski et al. |

| | | |
|---|---|---|
| 5,592,378 A | 1/1997 | Cameron |
| 5,592,553 A | 1/1997 | Guski et al. |
| 5,592,560 A | 1/1997 | Deaton et al. |
| 5,594,837 A | 1/1997 | Noyes |
| 5,598,557 A | 1/1997 | Doner |
| 5,602,936 A | 2/1997 | Lynn et al. |
| 5,603,025 A | 2/1997 | Tabb |
| 5,604,490 A | 2/1997 | Blakley et al. |
| 5,606,496 A | 2/1997 | D'Agostino |
| 5,611,052 A | 3/1997 | Dykstra |
| 5,615,277 A | 3/1997 | Hoffman |
| 5,617,474 A | 4/1997 | Ditzig et al. |
| 5,621,201 A | 4/1997 | Langhans |
| 5,621,789 A | 4/1997 | McCalmont |
| 5,621,812 A | 4/1997 | Deaton et al. |
| 5,625,767 A | 4/1997 | Bartell |
| 5,634,101 A | 5/1997 | Blau |
| 5,638,457 A | 6/1997 | Deaton et al. |
| 5,640,577 A | 6/1997 | Scharmer |
| 5,642,419 A | 6/1997 | Rosen |
| 5,642,485 A | 6/1997 | Deaton et al. |
| 5,644,493 A | 7/1997 | Motai |
| 5,644,723 A | 7/1997 | Deaton et al. |
| 5,644,778 A | 7/1997 | Burks et al. |
| 5,646,998 A | 7/1997 | Stambler |
| 5,649,114 A | 7/1997 | Deaton et al. |
| 5,652,786 A | 7/1997 | Rogers |
| 5,653,914 A | 8/1997 | Holmes et al. |
| 5,657,383 A | 8/1997 | Gerber |
| 5,657,390 A | 8/1997 | Elgamal et al. |
| 5,659,165 A | 8/1997 | Jennings |
| 5,659,469 A | 8/1997 | Deaton et al. |
| 5,661,807 A | 8/1997 | Guski et al. |
| 5,664,115 A | 9/1997 | Fraser |
| 5,666,493 A | 9/1997 | Wojcik et al. |
| 5,671,285 A | 9/1997 | Newman |
| 5,675,637 A | 10/1997 | Szlam et al. |
| 5,675,662 A | 10/1997 | Deaton et al. |
| 5,677,521 A | 10/1997 | Garrou |
| 5,677,955 A | 10/1997 | Doggett et al. |
| 5,678,046 A | 10/1997 | Cahill et al. |
| 5,680,459 A | 10/1997 | Hook et al. |
| 5,682,524 A | 10/1997 | Freund |
| 5,684,870 A | 11/1997 | Maloney |
| 5,687,322 A | 11/1997 | Deaton et al. |
| 5,689,100 A | 11/1997 | Carrithers et al. |
| 5,692,124 A | 11/1997 | Holden et al. |
| 5,692,132 A | 11/1997 | Hogan |
| 5,698,837 A | 12/1997 | Furuta |
| 5,699,528 A | 12/1997 | Hogan |
| 5,703,344 A | 12/1997 | Bezy et al. |
| 5,704,044 A | 12/1997 | Tarter et al. |
| 5,706,452 A | 1/1998 | Ivanov |
| 5,710,886 A | 1/1998 | Christensen et al. |
| 5,710,887 A | 1/1998 | Chelliah |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,715,402 A | 2/1998 | Popolo |
| 5,715,450 A | 2/1998 | Ambrose |
| 5,724,423 A | 3/1998 | Khello |
| 5,724,424 A | 3/1998 | Gifford |
| 5,727,163 A | 3/1998 | Bezos |
| 5,734,838 A | 3/1998 | Robinson |
| 5,737,414 A | 4/1998 | Walker et al. |
| 5,740,231 A | 4/1998 | Cohn et al. |
| 5,742,845 A | 4/1998 | Wagner |
| 5,745,555 A | 4/1998 | Mark |
| 5,754,840 A | 5/1998 | Rivette |
| 5,758,126 A | 5/1998 | Daniels et al. |
| 5,758,328 A | 5/1998 | Giovannoli |
| 5,761,288 A | 6/1998 | Gray et al. |
| 5,761,647 A | 6/1998 | Boushy |
| 5,761,661 A | 6/1998 | Coussens |
| 5,764,770 A | 6/1998 | Schipper et al. |
| 5,764,789 A | 6/1998 | Pare et al. |
| 5,765,141 A | 6/1998 | Spector |
| 5,765,143 A | 6/1998 | Sheldon |
| 5,768,382 A | 6/1998 | Schneier et al. |
| 5,774,122 A | 6/1998 | Kojima |
| 5,778,178 A | 7/1998 | Arunachalam |
| 5,781,909 A | 7/1998 | Logan et al. |
| 5,784,562 A | 7/1998 | Diener |
| 5,787,403 A | 7/1998 | Randle |
| 5,787,404 A | 7/1998 | Fernandez-Holmann |
| 5,789,732 A | 8/1998 | McMahon et al. |
| 5,790,650 A | 8/1998 | Dunn |
| 5,790,785 A | 8/1998 | Klug et al. |
| 5,793,302 A | 8/1998 | Stambler |
| 5,793,861 A | 8/1998 | Haigh |
| 5,794,178 A | 8/1998 | Caid et al. |
| 5,794,207 A | 8/1998 | Walker |
| 5,794,259 A | 8/1998 | Kikinis |
| 5,796,395 A | 8/1998 | De Hond |
| 5,796,827 A | 8/1998 | Coppersmith et al. |
| 5,797,127 A | 8/1998 | Walker et al. |
| 5,798,508 A | 8/1998 | Walker et al. |
| 5,802,498 A | 9/1998 | Comesanas |
| 5,802,502 A | 9/1998 | Gell |
| 5,805,719 A | 9/1998 | Pare et al. |
| 5,815,657 A | 9/1998 | Williams et al. |
| 5,815,665 A | 9/1998 | Teper et al. |
| 5,815,683 A | 9/1998 | Vogler |
| 5,818,936 A | 10/1998 | Moshayekhi |
| 5,819,092 A | 10/1998 | Ferguson |
| 5,819,285 A | 10/1998 | Damico |
| 5,825,003 A | 10/1998 | Jennings et al. |
| 5,825,863 A | 10/1998 | Walker |
| 5,825,870 A | 10/1998 | Miloslavsky |
| 5,825,871 A | 10/1998 | Mark |
| 5,825,890 A | 10/1998 | Elgamal et al. |
| 5,826,023 A | 10/1998 | Hall et al. |
| 5,826,241 A | 10/1998 | Stein |
| 5,826,245 A | 10/1998 | Sandberg-Diment |
| 5,826,250 A | 10/1998 | Trefler |
| 5,828,734 A | 10/1998 | Katz |
| 5,828,751 A | 10/1998 | Walker et al. |
| 5,828,812 A | 10/1998 | Khan et al. |
| 5,828,833 A | 10/1998 | Belville et al. |
| 5,832,090 A | 11/1998 | Raspotnik |
| 5,832,211 A | 11/1998 | Blakley, III et al. |
| 5,832,457 A | 11/1998 | O'Brien |
| 5,832,460 A | 11/1998 | Bednar |
| 5,832,476 A | 11/1998 | Tada |
| 5,835,087 A | 11/1998 | Herz |
| 5,835,580 A | 11/1998 | Fraser |
| 5,835,603 A | 11/1998 | Coutts |
| 5,838,812 A | 11/1998 | Pare et al. |
| 5,838,903 A | 11/1998 | Blakely, III et al. |
| 5,838,906 A | 11/1998 | Doyle |
| 5,841,869 A | 11/1998 | Merkling et al. |
| 5,842,178 A | 11/1998 | Giovannoli |
| 5,842,211 A | 11/1998 | Horadan |
| 5,842,421 A | 12/1998 | Desilets et al. |
| 5,844,553 A | 12/1998 | Hao |
| 5,845,259 A | 12/1998 | West et al. |
| 5,845,260 A | 12/1998 | Nakano et al. |
| 5,847,709 A | 12/1998 | Card |
| 5,848,143 A | 12/1998 | Andrews |
| 5,848,190 A | 12/1998 | Kleehammer et al. |
| 5,848,400 A | 12/1998 | Chang |
| 5,848,427 A | 12/1998 | Hyodo |
| 5,852,811 A | 12/1998 | Atkins |
| 5,852,812 A | 12/1998 | Reeder |
| 5,857,023 A | 1/1999 | Demers et al. |
| 5,857,079 A | 1/1999 | Claus et al. |
| 5,859,419 A | 1/1999 | Wynn |
| 5,861,906 A | 1/1999 | Dunn et al. |
| 5,862,223 A | 1/1999 | Walker |
| 5,862,323 A | 1/1999 | Blakley, III et al. |
| 5,864,830 A | 1/1999 | Armetta et al. |
| 5,864,871 A | 1/1999 | Kitain et al. |
| RE36,116 E | 2/1999 | McCarthy |
| 5,866,889 A | 2/1999 | Weiss et al. |
| 5,870,456 A | 2/1999 | Rogers |
| 5,870,718 A | 2/1999 | Spector |
| 5,870,721 A | 2/1999 | Norris |

| | | | | | | |
|---|---|---|---|---|---|---|
| 5,870,724 A | 2/1999 | Lawlor | | 5,970,480 A | 10/1999 | Kalina |
| 5,870,725 A | 2/1999 | Bellinger et al. | | 5,970,482 A | 10/1999 | Pham |
| 5,871,398 A | 2/1999 | Schneier et al. | | 5,970,483 A | 10/1999 | Evans |
| 5,873,072 A | 2/1999 | Kight | | 5,974,148 A | 10/1999 | Stambler |
| 5,873,096 A | 2/1999 | Lim | | 5,978,467 A | 11/1999 | Walker et al. |
| 5,875,296 A | 2/1999 | Shi et al. | | 5,982,370 A | 11/1999 | Kamper |
| 5,878,141 A | 3/1999 | Daly et al. | | 5,983,196 A | 11/1999 | Wendkos |
| 5,878,405 A | 3/1999 | Grant et al. | | 5,987,434 A | 11/1999 | Libman |
| 5,880,769 A | 3/1999 | Nemirofsky | | 5,987,454 A | 11/1999 | Hobbs |
| 5,883,810 A | 3/1999 | Franklin et al. | | 5,987,498 A | 11/1999 | Athing et al. |
| 5,884,032 A | 3/1999 | Bateman | | 5,991,736 A | 11/1999 | Ferguson et al. |
| 5,884,270 A | 3/1999 | Walker et al. | | 5,991,738 A | 11/1999 | Ogram |
| 5,884,272 A | 3/1999 | Walker et al. | | 5,991,740 A * | 11/1999 | Messer ............ 705/27 |
| 5,884,274 A | 3/1999 | Walker et al. | | 5,991,748 A | 11/1999 | Taskett |
| 5,884,288 A | 3/1999 | Chang | | 5,991,751 A | 11/1999 | Rivette et al. |
| 5,884,312 A | 3/1999 | Dustan et al. | | 5,991,780 A | 11/1999 | Rivette |
| 5,889,863 A | 3/1999 | Weber | | 5,991,878 A | 11/1999 | McDonough et al. |
| 5,892,900 A | 4/1999 | Ginter et al. | | 5,995,948 A | 11/1999 | Whitford |
| 5,898,780 A | 4/1999 | Liu et al. | | 5,995,976 A | 11/1999 | Walker et al. |
| 5,898,838 A | 4/1999 | Wagner | | 5,999,596 A | 12/1999 | Walker et al. |
| 5,899,982 A | 5/1999 | Randle | | 5,999,907 A | 12/1999 | Donner |
| 5,903,878 A | 5/1999 | Talati et al. | | 5,999,971 A | 12/1999 | Buckland |
| 5,903,881 A | 5/1999 | Schrader | | 6,000,033 A | 12/1999 | Kelly et al. |
| 5,905,908 A | 5/1999 | Wagner | | 6,000,832 A | 12/1999 | Franklin et al. |
| 5,907,142 A | 5/1999 | Kelsey | | 6,001,016 A | 12/1999 | Walker et al. |
| 5,909,486 A | 6/1999 | Walker et al. | | 6,003,762 A | 12/1999 | Hayashida |
| 5,910,988 A | 6/1999 | Ballard | | 6,005,939 A | 12/1999 | Fortenberry et al. |
| 5,913,202 A | 6/1999 | Motoyama | | 6,005,943 A | 12/1999 | Cohen et al. |
| 5,914,472 A | 6/1999 | Foladare et al. | | 6,006,205 A | 12/1999 | Loeb et al. |
| 5,915,244 A | 6/1999 | Jack et al. | | 6,006,249 A | 12/1999 | Leong |
| 5,918,214 A | 6/1999 | Perkowski | | 6,009,411 A | 12/1999 | Kepecs |
| 5,918,217 A | 6/1999 | Maggioncalda | | 6,009,415 A | 12/1999 | Shurling et al. |
| 5,918,239 A | 6/1999 | Allen et al. | | 6,009,442 A | 12/1999 | Chen et al. |
| 5,920,847 A | 7/1999 | Kolling et al. | | 6,010,404 A | 1/2000 | Walker et al. |
| 5,921,864 A | 7/1999 | Walker et al. | | 6,012,049 A | 1/2000 | Kawan |
| 5,923,552 A | 7/1999 | Brown et al. | | 6,012,088 A | 1/2000 | Li et al. |
| 5,923,763 A | 7/1999 | Walker et al. | | 6,012,983 A | 1/2000 | Walker et al. |
| 5,926,796 A | 7/1999 | Walker et al. | | 6,014,439 A | 1/2000 | Walker et al. |
| 5,926,812 A | 7/1999 | Hilsenrath | | 6,014,635 A | 1/2000 | Harris et al. |
| 5,930,764 A | 7/1999 | Melchione | | 6,014,636 A | 1/2000 | Reeder |
| 5,933,812 A | 8/1999 | Meyer et al. | | 6,014,638 A | 1/2000 | Burge et al. |
| 5,933,816 A | 8/1999 | Zeanah et al. | | 6,014,641 A | 1/2000 | Loeb et al. |
| 5,933,817 A | 8/1999 | Hucal | | 6,014,645 A | 1/2000 | Cunningham |
| 5,933,823 A | 8/1999 | Cullen | | 6,016,476 A | 1/2000 | Maes et al. |
| 5,933,827 A | 8/1999 | Cole et al. | | 6,016,810 A | 1/2000 | Ravenscroft |
| 5,936,541 A | 8/1999 | Stambler | | 6,018,714 A | 1/2000 | Risen, Jr. |
| 5,940,811 A | 8/1999 | Norris | | 6,018,718 A | 1/2000 | Walker et al. |
| 5,940,812 A | 8/1999 | Tengel et al. | | 6,024,640 A | 2/2000 | Walker et al. |
| 5,940,843 A | 8/1999 | Zucknovich et al. | | 6,026,398 A | 2/2000 | Brown et al. |
| 5,943,656 A | 8/1999 | Crooks | | 6,026,429 A | 2/2000 | Jones et al. |
| 5,944,824 A | 8/1999 | He | | 6,029,141 A | 2/2000 | Bezos et al. |
| 5,945,653 A | 8/1999 | Walker et al. | | 6,029,153 A | 2/2000 | Bauchner et al. |
| 5,946,388 A | 8/1999 | Walker et al. | | 6,029,890 A | 2/2000 | Austin |
| 5,947,747 A | 9/1999 | Walker et al. | | 6,032,134 A | 2/2000 | Weissman |
| 5,949,044 A | 9/1999 | Walker et al. | | 6,032,136 A | 2/2000 | Brake, Jr. et al. |
| 5,949,875 A | 9/1999 | Walker et al. | | 6,032,147 A | 2/2000 | Williams et al. |
| 5,950,173 A | 9/1999 | Perkowski | | 6,038,547 A | 3/2000 | Casto |
| 5,950,174 A | 9/1999 | Brendzel | | 6,038,552 A | 3/2000 | Fleischl et al. |
| 5,950,206 A | 9/1999 | Krause | | 6,042,006 A | 3/2000 | Van Tilburg et al. |
| 5,952,639 A | 9/1999 | Ohki et al. | | 6,044,362 A | 3/2000 | Neely |
| 5,952,641 A | 9/1999 | Korshun | | 6,044,402 A | 3/2000 | Jacobson et al. |
| 5,953,710 A | 9/1999 | Fleming | | 6,045,039 A | 4/2000 | Stinson et al. |
| 5,956,695 A | 9/1999 | Carrithers et al. | | 6,047,268 A | 4/2000 | Bartoli et al. |
| 5,958,007 A | 9/1999 | Lee et al. | | 6,049,778 A | 4/2000 | Walker et al. |
| 5,960,411 A | 9/1999 | Hartman et al. | | 6,049,782 A | 4/2000 | Gottesman et al. |
| 5,961,593 A | 10/1999 | Gabber et al. | | 6,049,835 A | 4/2000 | Gagnon |
| 5,963,635 A | 10/1999 | Szlam et al. | | 6,055,637 A | 4/2000 | Hudson et al. |
| 5,963,647 A | 10/1999 | Downing et al. | | 6,061,660 A | 5/2000 | Eggleston et al. |
| 5,963,915 A | 10/1999 | Kirsch | | 6,061,665 A | 5/2000 | Bahreman |
| 5,963,925 A | 10/1999 | Kolling et al. | | 6,064,987 A | 5/2000 | Walker et al. |
| 5,963,952 A | 10/1999 | Smith | | 6,065,120 A | 5/2000 | Laursen et al. |
| 5,963,953 A | 10/1999 | Cram et al. | | 6,065,675 A | 5/2000 | Teicher |
| 5,966,695 A | 10/1999 | Melchione et al. | | 6,067,531 A | 5/2000 | Hoyt et al. |
| 5,966,699 A | 10/1999 | Zandi | | 6,069,968 A | 5/2000 | Shaw et al. |
| 5,967,896 A | 10/1999 | Jorasch et al. | | 6,070,147 A | 5/2000 | Harms et al. |
| 5,969,318 A | 10/1999 | Mackenthun | | 6,070,153 A | 5/2000 | Simpson |
| 5,970,143 A | 10/1999 | Schneier et al. | | 6,070,244 A | 5/2000 | Orchier et al. |
| 5,970,470 A | 10/1999 | Walker et al. | | 6,073,105 A | 6/2000 | Sutcliffe et al. |
| 5,970,478 A | 10/1999 | Walker et al. | | 6,073,113 A | 6/2000 | Guinan |

| | | | | | | |
|---|---|---|---|---|---|---|
| 6,075,519 | A | 6/2000 | Okatani et al. | 6,216,115 B1 | 4/2001 | Barrameda et al. |
| 6,076,072 | A | 6/2000 | Libman | 6,219,639 B1 | 4/2001 | Bakis et al. |
| 6,081,790 | A | 6/2000 | Rosen | 6,219,706 B1 | 4/2001 | Fan |
| 6,081,810 | A | 6/2000 | Rosenzweig et al. | 6,222,914 B1 | 4/2001 | McMullin |
| 6,081,900 | A | 6/2000 | Subramaniam et al. | 6,223,168 B1 | 4/2001 | McGurl et al. |
| 6,085,168 | A | 7/2000 | Mori et al. | 6,226,623 B1 | 5/2001 | Schein et al. |
| 6,088,444 | A | 7/2000 | Walker et al. | 6,226,679 B1 | 5/2001 | Gupta |
| 6,088,451 | A | 7/2000 | He et al. | 6,226,752 B1 | 5/2001 | Gupta et al. |
| 6,088,683 | A | 7/2000 | Jalili | 6,227,447 B1 | 5/2001 | Campisano |
| 6,088,686 | A | 7/2000 | Walker et al. | 6,230,148 B1 | 5/2001 | Pare et al. |
| 6,088,700 | A | 7/2000 | Larsen et al. | 6,243,688 B1 | 6/2001 | Kalina |
| 6,091,817 | A | 7/2000 | Bertina et al. | 6,243,689 B1 | 6/2001 | Norton |
| 6,092,057 | A | 7/2000 | Zimmerman et al. | 6,243,816 B1 | 6/2001 | Fang et al. |
| 6,092,192 | A | 7/2000 | Kanevsky et al. | 6,246,996 B1 | 6/2001 | Stein et al. |
| 6,092,196 | A | 7/2000 | Reiche | 6,253,327 B1 | 6/2001 | Zhang et al. |
| 6,095,412 | A | 8/2000 | Bertina et al. | 6,253,328 B1 | 6/2001 | Smith, Jr. |
| 6,098,070 | A | 8/2000 | Maxwell | 6,256,664 B1 | 7/2001 | Donoho et al. |
| 6,101,486 | A | 8/2000 | Roberts et al. | 6,260,026 B1 | 7/2001 | Tomida et al. |
| 6,104,716 | A | 8/2000 | Crichton et al. | 6,266,648 B1 | 7/2001 | Baker, III |
| 6,105,006 | A | 8/2000 | Davis et al. | 6,266,683 B1 | 7/2001 | Yehuda et al. |
| 6,105,007 | A | 8/2000 | Norris | 6,267,292 B1 | 7/2001 | Walker et al. |
| 6,105,012 | A | 8/2000 | Chang et al. | 6,269,348 B1 | 7/2001 | Pare et al. |
| 6,105,865 | A | 8/2000 | Hardesty | 6,275,944 B1 | 8/2001 | Kao et al. |
| 6,108,642 | A | 8/2000 | Findley | 6,278,996 B1 | 8/2001 | Richardson et al. |
| 6,111,858 | A | 8/2000 | Greaves et al. | 6,289,322 B1 | 9/2001 | Kitchen et al. |
| 6,112,181 | A | 8/2000 | Shear et al. | 6,289,324 B1 | 9/2001 | Kawan |
| 6,115,641 | A | 9/2000 | Brown et al. | 6,292,786 B1 | 9/2001 | Deaton et al. |
| 6,115,642 | A | 9/2000 | Brown et al. | 6,298,330 B1 | 10/2001 | Gardenswartz et al. |
| 6,115,690 | A | 9/2000 | Wong | 6,298,356 B1 | 10/2001 | Jawahar et al. |
| 6,119,093 | A | 9/2000 | Walker et al. | 6,301,567 B1 | 10/2001 | Leong et al. |
| 6,119,099 | A | 9/2000 | Walker et al. | 6,308,273 B1 | 10/2001 | Goertzel et al. |
| 6,119,933 | A | 9/2000 | Wong et al. | 6,308,274 B1 | 10/2001 | Swift |
| 6,128,599 | A | 10/2000 | Walker et al. | 6,311,275 B1 | 10/2001 | Jin et al. |
| 6,128,602 | A | 10/2000 | Northington et al. | 6,315,195 B1 | 11/2001 | Ramachandran |
| 6,131,810 | A | 10/2000 | Weiss et al. | 6,317,834 B1 | 11/2001 | Gennaro et al. |
| 6,134,549 | A | 10/2000 | Regnier et al. | 6,317,838 B1 | 11/2001 | Baize |
| 6,134,592 | A | 10/2000 | Montulli | 6,321,337 B1 | 11/2001 | Reshef et al. |
| 6,135,349 | A | 10/2000 | Zirkel | 6,324,524 B1 | 11/2001 | Lent et al. |
| 6,138,106 | A | 10/2000 | Walker et al. | 6,327,573 B1 | 12/2001 | Walker et al. |
| 6,138,118 | A | 10/2000 | Koppstein et al. | 6,327,575 B1 | 12/2001 | Katz |
| 6,138,911 | A | 10/2000 | Fredregill et al. | 6,327,578 B1 | 12/2001 | Linehan |
| 6,141,651 | A | 10/2000 | Riley et al. | 6,330,543 B1 | 12/2001 | Kepecs |
| 6,141,666 | A | 10/2000 | Tobin | 6,332,126 B1 | 12/2001 | Peirce et al. |
| 6,144,848 | A | 11/2000 | Walsh et al. | 6,332,192 B1 | 12/2001 | Boroditsky et al. |
| 6,144,946 | A | 11/2000 | Iwamura | 6,334,108 B1 | 12/2001 | Deaton et al. |
| 6,144,948 | A | 11/2000 | Walker et al. | 6,336,104 B1 | 1/2002 | Walker et al. |
| 6,145,086 | A | 11/2000 | Bellemore et al. | 6,339,423 B1 | 1/2002 | Sampson et al. |
| 6,148,293 | A | 11/2000 | King | 6,341,724 B2 | 1/2002 | Campisano |
| 6,151,584 | A | 11/2000 | Papierniak et al. | 6,343,279 B1 | 1/2002 | Bissonette et al. |
| 6,154,750 | A | 11/2000 | Roberge et al. | 6,343,323 B1 | 1/2002 | Kalpio et al. |
| 6,154,879 | A | 11/2000 | Pare et al. | 6,345,261 B1 | 2/2002 | Feidelson |
| 6,161,113 | A | 12/2000 | Mora et al. | 6,349,242 B2 | 2/2002 | Mahaffey |
| 6,161,182 | A | 12/2000 | Nadooshan | 6,349,290 B1 | 2/2002 | Horowitz et al. |
| 6,163,771 | A | 12/2000 | Walker et al. | 6,349,336 B1 | 2/2002 | Sit et al. |
| 6,164,533 | A | 12/2000 | Barton | 6,360,209 B1 | 3/2002 | Loeb et al. |
| 6,169,974 | B1 | 1/2001 | Baumgartner et al. | 6,360,250 B1 | 3/2002 | Anupam et al. |
| 6,170,011 | B1 | 1/2001 | Beck et al. | 6,360,254 B1 | 3/2002 | Linden et al. |
| 6,178,408 | B1 | 1/2001 | Copple et al. | 6,363,381 B1 | 3/2002 | Lee et al. |
| 6,178,511 | B1 | 1/2001 | Cohen et al. | 6,366,682 B1 | 4/2002 | Hoffman et al. |
| 6,182,052 | B1 | 1/2001 | Fulton et al. | 6,381,587 B1 | 4/2002 | Guzelsu |
| 6,182,059 | B1 | 1/2001 | Angotti et al. | 6,385,591 B1 | 5/2002 | Mankoff |
| 6,182,142 | B1 | 1/2001 | Win et al. | 6,385,652 B1 | 5/2002 | Brown et al. |
| 6,182,220 | B1 | 1/2001 | Chen et al. | 6,401,125 B1 | 6/2002 | Makarios et al. |
| 6,182,225 | B1 | 1/2001 | Hagiuda et al. | 6,401,206 B1 | 6/2002 | Khan et al. |
| 6,185,242 | B1 | 2/2001 | Arthur et al. | 6,401,211 B1 | 6/2002 | Brezak, Jr. et al. |
| 6,188,309 | B1 | 2/2001 | Levine | 6,404,866 B1 | 6/2002 | Hopper et al. |
| 6,189,029 | B1 | 2/2001 | Fuerst | 6,405,175 B1 | 6/2002 | Ng |
| 6,189,787 | B1 | 2/2001 | Dorf | 6,405,181 B2 | 6/2002 | Lent et al. |
| 6,195,644 | B1 | 2/2001 | Bowie | 6,408,389 B2 | 6/2002 | Grawrock et al. |
| 6,199,077 | B1 | 3/2001 | Inala et al. | 6,409,080 B2 | 6/2002 | Kawagishi |
| 6,201,948 | B1 | 3/2001 | Cook et al. | 6,411,933 B1 | 6/2002 | Maes et al. |
| 6,202,005 | B1 | 3/2001 | Mahaffey | 6,411,947 B1 | 6/2002 | Rice et al. |
| 6,202,054 | B1 | 3/2001 | Lawlor et al. | 6,418,457 B1 | 7/2002 | Schmidt et al. |
| 6,202,066 | B1 | 3/2001 | Barkley | 6,421,768 B1 | 7/2002 | Purpura |
| 6,202,151 | B1 | 3/2001 | Musgrave et al. | 6,424,947 B1 | 7/2002 | Tsuria et al. |
| 6,202,158 | B1 | 3/2001 | Urano et al. | 6,424,949 B1 | 7/2002 | Deaton et al. |
| 6,208,978 | B1 | 3/2001 | Walker et al. | 6,424,951 B1 | 7/2002 | Shurling et al. |
| 6,208,984 | B1 | 3/2001 | Rosenthal | 6,434,534 B1 | 8/2002 | Walker et al. |
| 6,213,391 | B1 | 4/2001 | Lewis | 6,438,219 B1 | 8/2002 | Karau et al. |

| Patent | Kind | Date | Inventor |
|---|---|---|---|
| 6,438,594 | B1 | 8/2002 | Bowman-Amuah |
| 6,438,666 | B2 | 8/2002 | Cassagnol et al. |
| 6,446,053 | B1 | 9/2002 | Elliott |
| 6,446,111 | B1 | 9/2002 | Lowery |
| 6,449,765 | B1 | 9/2002 | Ballard |
| 6,453,353 | B1 | 9/2002 | Win et al. |
| 6,460,141 | B1 | 10/2002 | Olden |
| 6,470,357 | B1 | 10/2002 | Garcia, Jr. et al. |
| 6,484,149 | B1 | 11/2002 | Jammes |
| 6,487,641 | B1 | 11/2002 | Cusson et al. |
| 6,490,601 | B1 | 12/2002 | Markus et al. |
| 6,493,677 | B1 | 12/2002 | von Rosen et al. |
| 6,493,685 | B1 | 12/2002 | Ensel et al. |
| 6,496,855 | B1 | 12/2002 | Hunt et al. |
| 6,496,936 | B1 | 12/2002 | French et al. |
| 6,498,657 | B1 | 12/2002 | Kuntz et al. |
| 6,505,773 | B1 | 1/2003 | Palmer et al. |
| 6,507,912 | B1 | 1/2003 | Matyas, Jr. et al. |
| 6,510,464 | B1 | 1/2003 | Grantges et al. |
| 6,510,523 | B1 | 1/2003 | Perlman et al. |
| 6,513,019 | B2 | 1/2003 | Lewis |
| 6,516,302 | B1 | 2/2003 | Deaton et al. |
| 6,516,416 | B2 | 2/2003 | Gregg et al. |
| 6,519,763 | B1 | 2/2003 | Kaufer et al. |
| 6,526,404 | B1 | 2/2003 | Slater et al. |
| 6,532,284 | B2 | 3/2003 | Walker et al. |
| 6,535,855 | B1 | 3/2003 | Cahill et al. |
| 6,535,917 | B1 | 3/2003 | Zamanzadeh et al. |
| 6,535,980 | B1 | 3/2003 | Kumar et al. |
| 6,539,027 | B1 | 3/2003 | Cambron |
| 6,539,363 | B1 | 3/2003 | Allgeier et al. |
| 6,539,424 | B1 | 3/2003 | Dutta |
| 6,540,608 | B2 | 4/2003 | Howson |
| 6,546,392 | B1 | 4/2003 | Bahlmann |
| 6,549,972 | B1 | 4/2003 | Berstis et al. |
| 6,557,039 | B1 | 4/2003 | Leong et al. |
| 6,560,581 | B1 | 5/2003 | Fox et al. |
| 6,564,189 | B1 | 5/2003 | Nycz |
| 6,567,791 | B2 | 5/2003 | Lent et al. |
| 6,571,216 | B1 | 5/2003 | Garg et al. |
| 6,574,348 | B1 | 6/2003 | Venkatesan et al. |
| 6,578,012 | B1 | 6/2003 | Storey |
| 6,580,814 | B1 | 6/2003 | Ittycheriah et al. |
| 6,581,040 | B1 | 6/2003 | Wright et al. |
| 6,584,505 | B1 | 6/2003 | Howard et al. |
| 6,584,508 | B1 | 6/2003 | Epstein et al. |
| 6,587,835 | B1 | 7/2003 | Treyz et al. |
| 6,589,291 | B1 | 7/2003 | Boag et al. |
| 6,592,044 | B1 | 7/2003 | Wong et al. |
| 6,594,640 | B1 | 7/2003 | Postrel |
| 6,607,127 | B2 | 8/2003 | Wong |
| 6,609,104 | B1 | 8/2003 | Deaton et al. |
| 6,609,106 | B1 | 8/2003 | Robertson |
| 6,609,113 | B1 | 8/2003 | O'Leary et al. |
| 6,609,125 | B1 | 8/2003 | Layne et al. |
| 6,609,198 | B1 | 8/2003 | Wood et al. |
| 6,609,654 | B1 | 8/2003 | Anderson et al. |
| 6,611,498 | B1 | 8/2003 | Baker et al. |
| 6,611,811 | B1 | 8/2003 | Deaton et al. |
| 6,611,819 | B1 | 8/2003 | Oneda |
| 6,615,251 | B1 | 9/2003 | Klug et al. |
| 6,618,579 | B1 | 9/2003 | Smith et al. |
| 6,618,806 | B1 | 9/2003 | Brown et al. |
| 6,623,415 | B2 | 9/2003 | Gates et al. |
| 6,624,761 | B2 | 9/2003 | Fallon |
| 6,631,849 | B2 | 10/2003 | Blossom |
| 6,640,302 | B1 | 10/2003 | Subramaniam et al. |
| 6,641,050 | B2 | 11/2003 | Kelley et al. |
| 6,647,376 | B1 | 11/2003 | Farrar et al. |
| 6,651,168 | B1 | 11/2003 | Kao et al. |
| 6,662,215 | B1 | 12/2003 | Moskowitz et al. |
| 6,668,321 | B2 | 12/2003 | Nendell et al. |
| 6,668,322 | B1 | 12/2003 | Wood et al. |
| 6,671,818 | B1 | 12/2003 | Mikurak |
| 6,675,261 | B2 | 1/2004 | Shandony |
| 6,678,664 | B1 | 1/2004 | Ganesan |
| 6,684,195 | B1 | 1/2004 | Deaton et al. |
| 6,684,212 | B1 | 1/2004 | Day et al. |
| 6,684,248 | B1 | 1/2004 | Janacek et al. |
| 6,684,384 | B1 | 1/2004 | Bickerton et al. |
| 6,687,222 | B1 | 2/2004 | Albert et al. |
| 6,687,245 | B2 | 2/2004 | Fangman et al. |
| 6,697,947 | B1 | 2/2004 | Matyas, Jr. et al. |
| 6,714,919 | B1 | 3/2004 | Findley |
| 6,714,987 | B1 | 3/2004 | Amin et al. |
| 6,718,313 | B1 | 4/2004 | Lent et al. |
| 6,718,482 | B2 | 4/2004 | Sato et al. |
| 6,718,535 | B1 | 4/2004 | Underwood |
| 6,721,743 | B1 | 4/2004 | Sakakibara |
| 6,725,269 | B1 | 4/2004 | Megiddo |
| 6,727,802 | B2 | 4/2004 | Kelly et al. |
| 6,735,695 | B1 | 5/2004 | Gopalakrishnan et al. |
| 6,735,778 | B2 | 5/2004 | Khoo et al. |
| 6,738,779 | B1 | 5/2004 | Shapira |
| D490,840 | S | 6/2004 | Arakaki et al. |
| D491,186 | S | 6/2004 | Arakaki et al. |
| D491,953 | S | 6/2004 | Arakaki et al. |
| 6,751,654 | B2 | 6/2004 | Massarani et al. |
| 6,754,640 | B2 | 6/2004 | Bozeman |
| 6,754,833 | B1 | 6/2004 | Black et al. |
| 6,755,341 | B1 | 6/2004 | Wong et al. |
| 6,763,388 | B1 | 7/2004 | Tsimelzon |
| 6,766,370 | B2 | 7/2004 | Glommen et al. |
| 6,769,605 | B1 | 8/2004 | Magness |
| 6,772,146 | B2 | 8/2004 | Khemlani et al. |
| 6,775,783 | B1 | 8/2004 | Trostle |
| 6,785,810 | B1 | 8/2004 | Lirov et al. |
| D496,365 | S | 9/2004 | Liu et al. |
| 6,789,115 | B1 | 9/2004 | Singer et al. |
| 6,791,974 | B1 | 9/2004 | Greenberg |
| 6,792,572 | B1 | 9/2004 | Frohlick |
| 6,795,809 | B2 | 9/2004 | O'Brien et al. |
| 6,795,812 | B1 | 9/2004 | Lent et al. |
| 6,804,786 | B1 | 10/2004 | Chamley et al. |
| 6,805,288 | B2 | 10/2004 | Routhenstein et al. |
| 6,807,285 | B1 | 10/2004 | Iwamura |
| 6,810,395 | B1 | 10/2004 | Bharat |
| D498,236 | S | 11/2004 | Liu et al. |
| 6,817,008 | B2 | 11/2004 | Ledford et al. |
| 6,819,219 | B1 | 11/2004 | Bolle et al. |
| 6,819,748 | B2 | 11/2004 | Weiss et al. |
| 6,820,061 | B2 | 11/2004 | Postrel |
| 6,820,202 | B1 | 11/2004 | Wheeler et al. |
| 6,826,696 | B1 | 11/2004 | Chawla et al. |
| 6,829,586 | B2 | 12/2004 | Postrel |
| 6,832,202 | B1 | 12/2004 | Schuyler et al. |
| 6,832,587 | B2 | 12/2004 | Wampula et al. |
| 6,842,739 | B2 | 1/2005 | Postrel |
| 6,847,991 | B1 | 1/2005 | Kurapati |
| 6,856,970 | B1 | 2/2005 | Campbell et al. |
| RE38,717 | E | 3/2005 | Bothwell |
| 6,865,547 | B1 | 3/2005 | Brake, Jr. et al. |
| 6,868,391 | B1 | 3/2005 | Hultgren |
| 6,874,139 | B2 | 3/2005 | Krueger et al. |
| 6,889,198 | B2 | 5/2005 | Kawan |
| 6,892,231 | B2 | 5/2005 | Jager |
| 6,901,375 | B2 | 5/2005 | Fernandez |
| 6,901,406 | B2 | 5/2005 | Nabe et al. |
| 6,907,566 | B1 | 6/2005 | McElfresh et al. |
| 6,912,315 | B1 | 6/2005 | Wong et al. |
| 6,912,529 | B1 | 6/2005 | Kolfman |
| 6,915,271 | B1 | 7/2005 | Meyer et al. |
| 6,920,611 | B1 | 7/2005 | Spaeth et al. |
| 6,925,441 | B1 | 8/2005 | Jones, III et al. |
| 6,925,481 | B2 | 8/2005 | Singhal et al. |
| 6,931,382 | B2 | 8/2005 | Laage et al. |
| 6,934,848 | B1 | 8/2005 | King et al. |
| 6,937,976 | B2 | 8/2005 | Apte |
| 6,938,020 | B2 | 8/2005 | Nakayama |
| 6,938,048 | B1 | 8/2005 | Jilk et al. |
| 6,938,156 | B2 | 8/2005 | Wheeler et al. |
| 6,938,158 | B2 | 8/2005 | Azuma |
| RE38,801 | E | 9/2005 | Rogers |
| 6,947,897 | B2 | 9/2005 | Lortscher et al. |
| 6,947,898 | B2 | 9/2005 | Postrel |
| 6,950,826 | B1 | 9/2005 | Freeman |
| 6,950,881 | B1 | 9/2005 | Ndili |
| 6,950,936 | B2 | 9/2005 | Subramaniam et al. |

| Patent | Date | Inventor |
|---|---|---|
| 6,950,940 B2 | 9/2005 | Wheeler et al. |
| 6,954,932 B2 | 10/2005 | Nakamura et al. |
| 6,957,337 B1 | 10/2005 | Chainer et al. |
| 6,963,857 B1 | 11/2005 | Johnson |
| 6,965,939 B2 | 11/2005 | Cuomo et al. |
| 6,970,830 B1 | 11/2005 | Samra et al. |
| 6,976,067 B1 | 12/2005 | Gusler et al. |
| 6,976,164 B1 | 12/2005 | King et al. |
| 6,978,378 B1 | 12/2005 | Koretz |
| 6,980,962 B1 | 12/2005 | Arganbright et al. |
| 6,983,421 B1 | 1/2006 | Lahti et al. |
| 6,985,879 B2 | 1/2006 | Walker et al. |
| 6,992,786 B1 | 1/2006 | Breding et al. |
| 6,999,938 B1 | 2/2006 | Libman |
| 7,003,476 B1 | 2/2006 | Samra et al. |
| 7,003,565 B2 | 2/2006 | Hind et al. |
| 7,006,979 B1 | 2/2006 | Samra et al. |
| 7,006,983 B1 | 2/2006 | Packes et al. |
| 7,010,495 B1 | 3/2006 | Samra et al. |
| 7,010,512 B1 | 3/2006 | Gillin et al. |
| 7,013,286 B1 | 3/2006 | Aggarwal et al. |
| 7,020,696 B1 | 3/2006 | Perry et al. |
| 7,024,374 B1 | 4/2006 | Day et al. |
| 7,032,110 B1 | 4/2006 | Su et al. |
| 7,039,714 B1 | 5/2006 | Blakley III et al. |
| 7,043,455 B1 | 5/2006 | Cuomo et al. |
| 7,047,222 B1 | 5/2006 | Bush |
| 7,051,199 B1 | 5/2006 | Berson et al. |
| 7,051,330 B1 | 5/2006 | Kaler et al. |
| 7,051,929 B2 | 5/2006 | Li |
| 7,058,817 B1 | 6/2006 | Ellmore |
| 7,069,434 B1 | 6/2006 | Ilnicki et al. |
| 7,072,864 B2 | 7/2006 | Brake, Jr. et al. |
| 7,073,059 B2 | 7/2006 | Worely, Jr. et al. |
| 7,076,453 B2 | 7/2006 | Jammes et al. |
| 7,080,036 B1 | 7/2006 | Drummond et al. |
| 7,089,203 B1 | 8/2006 | Crookshanks |
| 7,089,208 B1 | 8/2006 | Levchin et al. |
| 7,089,503 B1 | 8/2006 | Bloomquist et al. |
| 7,089,585 B1 | 8/2006 | Dharmarajan |
| 7,090,138 B2 | 8/2006 | Rettenmyer et al. |
| 7,092,905 B2 | 8/2006 | Behrenbrinker et al. |
| 7,092,992 B1 | 8/2006 | Yu |
| 7,093,020 B1 | 8/2006 | McCarty et al. |
| 7,093,282 B2 | 8/2006 | Hillhouse |
| 7,103,556 B2 | 9/2006 | Del Rey et al. |
| 7,110,962 B2 | 9/2006 | Amon et al. |
| 7,117,239 B1 | 10/2006 | Hansen |
| 7,121,471 B2 | 10/2006 | Beenau et al. |
| 7,124,101 B1 | 10/2006 | Mikurak |
| 7,134,075 B2 | 11/2006 | Hind |
| 7,137,006 B1 | 11/2006 | Grandcolas et al. |
| 7,139,686 B1 | 11/2006 | Critz |
| 7,143,063 B2 | 11/2006 | Lent et al. |
| 7,152,242 B2 | 12/2006 | Douglas |
| 7,155,402 B1 | 12/2006 | Dvorak |
| 7,155,477 B2 | 12/2006 | Blair et al. |
| 7,161,506 B2 | 1/2007 | Fallon |
| 7,163,153 B2 | 1/2007 | Blossom |
| 7,165,256 B2 | 1/2007 | Boudnik et al. |
| 7,177,830 B2 | 2/2007 | Shields et al. |
| 7,185,094 B2 | 2/2007 | Marquette et al. |
| 7,188,181 B1 * | 3/2007 | Squier et al. ............ 709/228 |
| 7,191,952 B2 | 3/2007 | Blossom |
| 7,195,154 B2 | 3/2007 | Routhenstein |
| 7,197,470 B1 | 3/2007 | Arnett |
| 7,203,909 B1 | 4/2007 | Horvitz et al. |
| 7,225,249 B1 | 5/2007 | Barry |
| 7,225,462 B2 | 5/2007 | Bass et al. |
| 7,225,464 B2 | 5/2007 | Satyavolu et al. |
| 7,228,155 B2 | 6/2007 | Saunders |
| 7,246,263 B2 | 7/2007 | Skingle |
| 7,249,095 B2 | 7/2007 | Davies et al. |
| 7,249,097 B2 | 7/2007 | Hutchison et al. |
| 7,249,099 B2 | 7/2007 | Ling |
| 7,249,112 B2 | 7/2007 | Berardi et al. |
| 7,266,835 B2 | 9/2007 | Halbert |
| 7,266,839 B2 | 9/2007 | Bowers et al. |
| 7,299,201 B2 | 11/2007 | Jammes |
| 7,302,585 B1 * | 11/2007 | Proudler et al. ............ 713/189 |
| 7,312,707 B1 | 12/2007 | Bishop et al. |
| 7,313,802 B1 | 12/2007 | Tomsen |
| 7,321,864 B1 | 1/2008 | Gendler |
| 7,333,948 B2 | 2/2008 | Bell et al. |
| 7,340,773 B2 | 3/2008 | Edwards |
| 7,349,866 B2 | 3/2008 | Schwarz, Jr. |
| 7,356,516 B2 | 4/2008 | Richey et al. |
| 7,357,331 B2 | 4/2008 | Blossom |
| 7,370,011 B2 | 5/2008 | Bennett |
| 7,389,256 B1 | 6/2008 | Adams et al. |
| 7,395,241 B1 | 7/2008 | Cook et al. |
| 7,400,274 B2 | 7/2008 | Fallon et al. |
| 7,417,568 B2 | 8/2008 | Fallon et al. |
| 7,426,530 B1 | 9/2008 | Rosko et al. |
| 7,440,923 B1 | 10/2008 | Compiano |
| 7,444,672 B2 | 10/2008 | Ellmore |
| 7,467,096 B2 | 12/2008 | Antonucci et al. |
| 7,472,171 B2 | 12/2008 | Miller et al. |
| 7,485,040 B2 | 2/2009 | Walker et al. |
| 7,490,064 B2 | 2/2009 | Allin et al. |
| 7,493,288 B2 | 2/2009 | Biship et al. |
| 7,493,636 B2 | 2/2009 | Kitsukawa et al. |
| 7,496,950 B2 | 2/2009 | Carley |
| 7,506,804 B2 | 3/2009 | Zajkowski et al. |
| 7,506,806 B2 | 3/2009 | Bonalle et al. |
| 7,512,551 B2 | 3/2009 | Postrel |
| 7,523,385 B2 | 4/2009 | Nguyen et al. |
| 7,539,635 B1 | 5/2009 | Peak et al. |
| 7,542,921 B1 | 6/2009 | Hildreth |
| 7,545,931 B2 | 6/2009 | Dillaway |
| 7,549,170 B2 | 6/2009 | Stubblefield et al. |
| 7,580,857 B2 | 8/2009 | VanFleet et al. |
| 7,581,112 B2 | 8/2009 | Brown et al. |
| 7,587,363 B2 | 9/2009 | Cataline et al. |
| 7,599,856 B2 | 10/2009 | Agrawal et al. |
| 7,613,629 B2 | 11/2009 | Antonucci et al. |
| 7,630,935 B2 | 12/2009 | Loeger et al. |
| 7,640,205 B2 | 12/2009 | Michelassi et al. |
| 7,640,321 B2 | 12/2009 | Yabe et al. |
| 7,680,731 B1 | 3/2010 | Davies et al. |
| 7,680,732 B1 | 3/2010 | Davies et al. |
| 7,686,218 B2 | 3/2010 | Hessburg et al. |
| 7,689,504 B2 | 3/2010 | Warren et al. |
| 7,689,506 B2 | 3/2010 | Fei et al. |
| 7,707,111 B2 | 4/2010 | Brake, Jr. et al. |
| 7,729,925 B2 | 6/2010 | Maritzen et al. |
| 7,729,980 B2 | 6/2010 | Mittenzwei et al. |
| 7,747,866 B1 | 6/2010 | Everhart |
| 7,801,814 B2 | 9/2010 | Cataline et al. |
| 2001/0002487 A1 | 5/2001 | Grawrock et al. |
| 2001/0011250 A1 | 8/2001 | Paltenghe et al. |
| 2001/0011255 A1 | 8/2001 | Asay et al. |
| 2001/0012974 A1 | 8/2001 | Mahaffey |
| 2001/0016835 A1 | 8/2001 | Hansmann et al. |
| 2001/0023407 A1 | 9/2001 | Liyanearachchi et al. |
| 2001/0025253 A1 | 9/2001 | Heintz et al. |
| 2001/0027441 A1 | 10/2001 | Wankmueller |
| 2001/0027474 A1 | 10/2001 | Nachman et al. |
| 2001/0029464 A1 | 10/2001 | Schweitzwer |
| 2001/0029490 A1 | 10/2001 | Inamochi |
| 2001/0032183 A1 | 10/2001 | Landry |
| 2001/0032184 A1 | 10/2001 | Tenembaum |
| 2001/0032312 A1 | 10/2001 | Runje et al. |
| 2001/0034651 A1 | 10/2001 | Marks et al. |
| 2001/0034663 A1 | 10/2001 | Teveler et al. |
| 2001/0034718 A1 | 10/2001 | Shaked et al. |
| 2001/0034720 A1 | 10/2001 | Armes |
| 2001/0037243 A1 | 11/2001 | Rouston et al. |
| 2001/0037299 A1 | 11/2001 | Nichols et al. |
| 2001/0038033 A1 | 11/2001 | Habib |
| 2001/0039511 A1 | 11/2001 | Duckworth et al. |
| 2001/0044764 A1 | 11/2001 | Arnold |
| 2001/0047295 A1 | 11/2001 | Tenembaum |
| 2001/0047315 A1 * | 11/2001 | Siegel ............ 705/28 |
| 2001/0047342 A1 | 11/2001 | Cuervo |
| 2001/0049628 A1 | 12/2001 | Icho |
| 2001/0051917 A1 | 12/2001 | Bissonette et al. |
| 2001/0054003 A1 | 12/2001 | Chien et al. |

| | | | |
|---|---|---|---|
| 2001/0054059 A1 | 12/2001 | Marks et al. | |
| 2001/0055391 A1 | 12/2001 | Jacobs | |
| 2002/0002479 A1 | 1/2002 | Almog et al. | |
| 2002/0002495 A1 | 1/2002 | Ullman | |
| 2002/0002597 A1* | 1/2002 | Morrell, Jr. ............... 709/218 | |
| 2002/0004742 A1 | 1/2002 | Willcocks et al. | |
| 2002/0007313 A1 | 1/2002 | Mai et al. | |
| 2002/0007460 A1 | 1/2002 | Azuma | |
| 2002/0010599 A1 | 1/2002 | Levison | |
| 2002/0010621 A1 | 1/2002 | Bell et al. | |
| 2002/0010627 A1 | 1/2002 | Lerat | |
| 2002/0010668 A1 | 1/2002 | Travis et al. | |
| 2002/0011517 A1 | 1/2002 | Namekawa et al. | |
| 2002/0018585 A1 | 2/2002 | Kim | |
| 2002/0019938 A1 | 2/2002 | Aarons | |
| 2002/0023108 A1 | 2/2002 | Daswani et al. | |
| 2002/0026365 A1 | 2/2002 | Natanzon | |
| 2002/0029269 A1 | 3/2002 | McCarty et al. | |
| 2002/0031230 A1 | 3/2002 | Sweet et al. | |
| 2002/0032613 A1 | 3/2002 | Buettgenbach et al. | |
| 2002/0032622 A1 | 3/2002 | Petit et al. | |
| 2002/0032642 A1 | 3/2002 | Chichilnisky | |
| 2002/0032650 A1 | 3/2002 | Hauser et al. | |
| 2002/0032724 A1* | 3/2002 | Shibusawa et al. ........... 709/203 | |
| 2002/0040344 A1 | 4/2002 | Preiser et al. | |
| 2002/0042742 A1 | 4/2002 | Glover et al. | |
| 2002/0042774 A1 | 4/2002 | Ortiz et al. | |
| 2002/0042808 A1 | 4/2002 | Smith et al. | |
| 2002/0046106 A1 | 4/2002 | Ishibashi et al. | |
| 2002/0046110 A1 | 4/2002 | Gallagher | |
| 2002/0046116 A1 | 4/2002 | Hohle et al. | |
| 2002/0049605 A1 | 4/2002 | Hagi | |
| 2002/0052778 A1 | 5/2002 | Murphy et al. | |
| 2002/0055874 A1 | 5/2002 | Cohen | |
| 2002/0059103 A1 | 5/2002 | Anderson et al. | |
| 2002/0059141 A1 | 5/2002 | Davies et al. | |
| 2002/0059345 A1* | 5/2002 | Wang et al. ................. 707/513 | |
| 2002/0062253 A1 | 5/2002 | Dosh et al. | |
| 2002/0062257 A1 | 5/2002 | Minamishin et al. | |
| 2002/0065735 A1 | 5/2002 | Hatakama et al. | |
| 2002/0069104 A1 | 6/2002 | Beach et al. | |
| 2002/0069105 A1* | 6/2002 | do Rosario Botelho et al. ................. 705/14 | |
| 2002/0069109 A1 | 6/2002 | Wendkos | |
| 2002/0069122 A1* | 6/2002 | Yun et al. ................. 705/26 | |
| 2002/0069158 A1 | 6/2002 | Larkin et al. | |
| 2002/0069172 A1 | 6/2002 | Omshehe et al. | |
| 2002/0070270 A1 | 6/2002 | Narita et al. | |
| 2002/0072931 A1 | 6/2002 | Card | |
| 2002/0072974 A1 | 6/2002 | Pugliese et al. | |
| 2002/0072984 A1* | 6/2002 | Rothman et al. ............ 705/26 | |
| 2002/0073019 A1 | 6/2002 | Deaton | |
| 2002/0077890 A1 | 6/2002 | LaPointe et al. | |
| 2002/0077895 A1 | 6/2002 | Howell | |
| 2002/0077904 A1 | 6/2002 | Ali | |
| 2002/0077964 A1 | 6/2002 | Brody et al. | |
| 2002/0077966 A1 | 6/2002 | Harycki et al. | |
| 2002/0077978 A1 | 6/2002 | O'Leary et al. | |
| 2002/0078382 A1 | 6/2002 | Sheikh et al. | |
| 2002/0082920 A1 | 6/2002 | Austin et al. | |
| 2002/0082962 A1 | 6/2002 | Farris et al. | |
| 2002/0087349 A1 | 7/2002 | Wong | |
| 2002/0087447 A1 | 7/2002 | McDonald et al. | |
| 2002/0087471 A1 | 7/2002 | Ganesan et al. | |
| 2002/0091567 A1 | 7/2002 | Royston | |
| 2002/0095443 A1 | 7/2002 | Kovack | |
| 2002/0099601 A1 | 7/2002 | Farrell | |
| 2002/0099649 A1 | 7/2002 | Lee et al. | |
| 2002/0099826 A1 | 7/2002 | Summers et al. | |
| 2002/0099936 A1 | 7/2002 | Kou et al. | |
| 2002/0104006 A1 | 8/2002 | Boate et al. | |
| 2002/0104017 A1 | 8/2002 | Stefan | |
| 2002/0107731 A1 | 8/2002 | Teng | |
| 2002/0107788 A1 | 8/2002 | Cunningham | |
| 2002/0111859 A1 | 8/2002 | Sheldon et al. | |
| 2002/0111860 A1 | 8/2002 | Jones | |
| 2002/0111861 A1 | 8/2002 | Sakamoto et al. | |
| 2002/0111890 A1 | 8/2002 | Sloan et al. | |
| 2002/0111891 A1 | 8/2002 | Hoffman et al. | |
| 2002/0116266 A1 | 8/2002 | Marshall | |
| 2002/0116331 A1 | 8/2002 | Cataline et al. | |
| 2002/0120497 A1 | 8/2002 | King | |
| 2002/0120571 A1 | 8/2002 | Maung et al. | |
| 2002/0120846 A1 | 8/2002 | Stewart et al. | |
| 2002/0123926 A1 | 9/2002 | Bushold et al. | |
| 2002/0123946 A1 | 9/2002 | Haworth et al. | |
| 2002/0123955 A1 | 9/2002 | Andreski et al. | |
| 2002/0128903 A1 | 9/2002 | Kernahan | |
| 2002/0128916 A1 | 9/2002 | Beinecke | |
| 2002/0128977 A1 | 9/2002 | Nambiar et al. | |
| 2002/0133401 A1 | 9/2002 | Mount et al. | |
| 2002/0143614 A1 | 10/2002 | MacLean et al. | |
| 2002/0143621 A1 | 10/2002 | Donnelly et al. | |
| 2002/0143626 A1 | 10/2002 | Voltmer et al. | |
| 2002/0143874 A1 | 10/2002 | Marquette et al. | |
| 2002/0147633 A1 | 10/2002 | Rafizadeh | |
| 2002/0147691 A1 | 10/2002 | Davis et al. | |
| 2002/0152116 A1 | 10/2002 | Yan et al. | |
| 2002/0152118 A1 | 10/2002 | Hadjigeorgis | |
| 2002/0152123 A1 | 10/2002 | Giordano et al. | |
| 2002/0152163 A1 | 10/2002 | Bezos et al. | |
| 2002/0152179 A1 | 10/2002 | Racov | |
| 2002/0152279 A1* | 10/2002 | Sollenberger et al. ........ 709/217 | |
| 2002/0156900 A1 | 10/2002 | Marquette et al. | |
| 2002/0161630 A1 | 10/2002 | Kern et al. | |
| 2002/0161641 A1 | 10/2002 | Quinlan et al. | |
| 2002/0161901 A1* | 10/2002 | Weissman ................... 709/229 | |
| 2002/0165808 A1 | 11/2002 | Zamsky et al. | |
| 2002/0165949 A1 | 11/2002 | Na | |
| 2002/0169671 A1 | 11/2002 | Junger | |
| 2002/0174010 A1 | 11/2002 | Rice, III | |
| 2002/0174011 A1 | 11/2002 | Sanchez et al. | |
| 2002/0178056 A1 | 11/2002 | Lim | |
| 2002/0178112 A1 | 11/2002 | Goeller et al. | |
| 2002/0178113 A1 | 11/2002 | Clifford et al. | |
| 2002/0178213 A1* | 11/2002 | Parry ........................... 709/203 | |
| 2002/0184507 A1 | 12/2002 | Makower et al. | |
| 2002/0188478 A1 | 12/2002 | Breeland et al. | |
| 2002/0188509 A1 | 12/2002 | Ariff et al. | |
| 2002/0188511 A1 | 12/2002 | Johnson et al. | |
| 2002/0188565 A1 | 12/2002 | Nakamura et al. | |
| 2002/0188869 A1 | 12/2002 | Patrick | |
| 2002/0191548 A1 | 12/2002 | Ylonen et al. | |
| 2002/0194071 A1 | 12/2002 | Yoshizaki et al. | |
| 2002/0194119 A1 | 12/2002 | Wright et al. | |
| 2002/0198803 A1 | 12/2002 | Rowe | |
| 2002/0198806 A1 | 12/2002 | Blagg et al. | |
| 2002/0198807 A1 | 12/2002 | Kobayashi et al. | |
| 2003/0001888 A1 | 1/2003 | Power | |
| 2003/0004794 A1 | 1/2003 | Hamilton | |
| 2003/0004803 A1 | 1/2003 | Glover et al. | |
| 2003/0004809 A1 | 1/2003 | Palcic et al. | |
| 2003/0005288 A1 | 1/2003 | Moskowitz et al. | |
| 2003/0009374 A1 | 1/2003 | Moodie et al. | |
| 2003/0009379 A1 | 1/2003 | Narasimhan et al. | |
| 2003/0009393 A1 | 1/2003 | Norris | |
| 2003/0009426 A1 | 1/2003 | Ruiz-Sanchez | |
| 2003/0018523 A1 | 1/2003 | Rappaport et al. | |
| 2003/0018915 A1 | 1/2003 | Stoll | |
| 2003/0023557 A1 | 1/2003 | Moore | |
| 2003/0023880 A1 | 1/2003 | Edwards et al. | |
| 2003/0033252 A1 | 2/2003 | Buttridge et al. | |
| 2003/0034388 A1 | 2/2003 | Routhenstein et al. | |
| 2003/0036952 A1 | 2/2003 | Panttaja et al. | |
| 2003/0037131 A1 | 2/2003 | Verma | |
| 2003/0037142 A1 | 2/2003 | Munger et al. | |
| 2003/0040964 A1 | 2/2003 | Lacek | |
| 2003/0040995 A1 | 2/2003 | Daddario et al. | |
| 2003/0041165 A1 | 2/2003 | Spencer et al. | |
| 2003/0046173 A1 | 3/2003 | Benjier et al. | |
| 2003/0046587 A1 | 3/2003 | Bheemarasetti et al. | |
| 2003/0046589 A1 | 3/2003 | Gregg | |
| 2003/0048888 A1 | 3/2003 | Hopper et al. | |
| 2003/0050831 A1 | 3/2003 | Klayh | |
| 2003/0051026 A1 | 3/2003 | Carter et al. | |
| 2003/0055871 A1 | 3/2003 | Roses | |
| 2003/0061093 A1 | 3/2003 | Todd | |
| 2003/0061097 A1 | 3/2003 | Walker et al. | |

| | | |
|---|---|---|
| 2003/0061098 A1 | 3/2003 | Meyer |
| 2003/0061168 A1 | 3/2003 | Routhenstein |
| 2003/0065618 A1 | 4/2003 | VanDeBoe, Jr. |
| 2003/0069808 A1 | 4/2003 | Cardno |
| 2003/0070069 A1 | 4/2003 | Belapurkar et al. |
| 2003/0070084 A1 | 4/2003 | Satomaa et al. |
| 2003/0074580 A1 | 4/2003 | Knouse et al. |
| 2003/0079147 A1 | 4/2003 | Hsieh et al. |
| 2003/0083933 A1 | 5/2003 | McAlear |
| 2003/0083939 A1 | 5/2003 | Wohl |
| 2003/0084002 A1 | 5/2003 | Ericson et al. |
| 2003/0084345 A1 | 5/2003 | Bjornestad et al. |
| 2003/0084647 A1 | 5/2003 | Smith et al. |
| 2003/0085286 A1 | 5/2003 | Kelley et al. |
| 2003/0088462 A1 | 5/2003 | Carrithers et al. |
| 2003/0088470 A1 | 5/2003 | Cuervo |
| 2003/0088489 A1 | 5/2003 | Peters et al. |
| 2003/0088552 A1 | 5/2003 | Bennett et al. |
| 2003/0097298 A1 | 5/2003 | Klimpl et al. |
| 2003/0097574 A1 | 5/2003 | Upton |
| 2003/0101116 A1 | 5/2003 | Rosko et al. |
| 2003/0101454 A1 | 5/2003 | Ozer et al. |
| 2003/0105688 A1 | 6/2003 | Brown et al. |
| 2003/0105689 A1 | 6/2003 | Chandak et al. |
| 2003/0105981 A1 | 6/2003 | Miller et al. |
| 2003/0110399 A1 | 6/2003 | Rail |
| 2003/0115100 A1 | 6/2003 | Teicher |
| 2003/0115160 A1 | 6/2003 | Nowlin et al. |
| 2003/0119642 A1 | 6/2003 | Gates et al. |
| 2003/0120544 A1 | 6/2003 | Gritzbach et al. |
| 2003/0125969 A1 | 7/2003 | Kizer et al. |
| 2003/0126011 A1 | 7/2003 | Bryman et al. |
| 2003/0131357 A1 | 7/2003 | Kim |
| 2003/0144902 A1 | 7/2003 | Bowie |
| 2003/0149594 A1 | 8/2003 | Beazley et al. |
| 2003/0149629 A1 | 8/2003 | Claridge et al. |
| 2003/0149756 A1 | 8/2003 | Grieve et al. |
| 2003/0154171 A1 | 8/2003 | Karp et al. |
| 2003/0154403 A1 | 8/2003 | Keinsley et al. |
| 2003/0158776 A1 | 8/2003 | Landesmann |
| 2003/0158782 A1 | 8/2003 | Thomson et al. |
| 2003/0158818 A1 | 8/2003 | George et al. |
| 2003/0159072 A1 | 8/2003 | Bellinger et al. |
| 2003/0163700 A1 | 8/2003 | Paatero |
| 2003/0163733 A1 | 8/2003 | Barriga-Caceres et al. |
| 2003/0167199 A1 | 9/2003 | Thomann et al. |
| 2003/0167229 A1 | 9/2003 | Ludwig et al. |
| 2003/0171992 A1 | 9/2003 | Blagg et al. |
| 2003/0177067 A1 | 9/2003 | Cowell et al. |
| 2003/0182246 A1 | 9/2003 | Johnson et al. |
| 2003/0187787 A1 | 10/2003 | Freund |
| 2003/0191549 A1 | 10/2003 | Otsuka et al. |
| 2003/0195805 A1 | 10/2003 | Storey |
| 2003/0200141 A1 | 10/2003 | Robison |
| 2003/0200142 A1 | 10/2003 | Hicks et al. |
| 2003/0204460 A1 | 10/2003 | Robinson et al. |
| 2003/0205617 A1 | 11/2003 | Allen et al. |
| 2003/0208400 A1 | 11/2003 | Kuo et al. |
| 2003/0208439 A1 | 11/2003 | Rast |
| 2003/0212630 A1 | 11/2003 | Kahr |
| 2003/0212887 A1 | 11/2003 | Walther et al. |
| 2003/0216964 A1 | 11/2003 | MacLean et al. |
| 2003/0216967 A1 | 11/2003 | Williams |
| 2003/0216998 A1 | 11/2003 | Chang et al. |
| 2003/0217003 A1 | 11/2003 | Weinflash et al. |
| 2003/0218066 A1 | 11/2003 | Fernandes et al. |
| 2003/0220834 A1 | 11/2003 | Leung et al. |
| 2003/0220989 A1 | 11/2003 | Tsuji et al. |
| 2003/0225618 A1 | 12/2003 | Hessburg et al. |
| 2003/0225619 A1 | 12/2003 | Dokken et al. |
| 2003/0225688 A1 | 12/2003 | Dobbins |
| 2003/0229590 A1 | 12/2003 | Byrne et al. |
| 2003/0233255 A1 | 12/2003 | Dirienzo |
| 2003/0233278 A1 | 12/2003 | Marshall |
| 2003/0236712 A1 | 12/2003 | Antonucci et al. |
| 2004/0002916 A1 | 1/2004 | Timmerman et al. |
| 2004/0006487 A1 | 1/2004 | Tari |
| 2004/0010447 A1 | 1/2004 | Asayama |
| 2004/0010462 A1 | 1/2004 | Moon et al. |
| 2004/0015394 A1 | 1/2004 | Mok et al. |
| 2004/0019563 A1 | 1/2004 | Sines et al. |
| 2004/0029569 A1 | 2/2004 | Khan et al. |
| 2004/0031856 A1 | 2/2004 | Atsmon et al. |
| 2004/0039686 A1 | 2/2004 | Klebanoff |
| 2004/0039940 A1 | 2/2004 | Cox et al. |
| 2004/0044606 A1 | 3/2004 | Buttridge et al. |
| 2004/0049702 A1 | 3/2004 | Subramaniam et al. |
| 2004/0054931 A1 | 3/2004 | Himmel et al. |
| 2004/0064401 A1 | 4/2004 | Palaghita et al. |
| 2004/0078276 A1* | 4/2004 | Shimogori ............... 705/26 |
| 2004/0078324 A1 | 4/2004 | Lonnberg et al. |
| 2004/0078328 A1 | 4/2004 | Talbert et al. |
| 2004/0078332 A1 | 4/2004 | Ferguson et al. |
| 2004/0094624 A1 | 5/2004 | Fernandes et al. |
| 2004/0111363 A1 | 6/2004 | Trench et al. |
| 2004/0111371 A1 | 6/2004 | Friedman |
| 2004/0111610 A1 | 6/2004 | Slick et al. |
| 2004/0117409 A1 | 6/2004 | Scahill et al. |
| 2004/0117658 A1 | 6/2004 | Klaes |
| 2004/0122736 A1 | 6/2004 | Strock et al. |
| 2004/0122766 A1 | 6/2004 | Brooks et al. |
| 2004/0128248 A1 | 7/2004 | Fujihara et al. |
| 2004/0133787 A1 | 7/2004 | Doughty et al. |
| 2004/0138991 A1 | 7/2004 | Song et al. |
| 2004/0143526 A1 | 7/2004 | Monasterio et al. |
| 2004/0146159 A1 | 7/2004 | Rosen |
| 2004/0149544 A1 | 8/2004 | Dal Ferro |
| 2004/0153378 A1 | 8/2004 | Perkowski |
| 2004/0159700 A1 | 8/2004 | Khan et al. |
| 2004/0162773 A1 | 8/2004 | Del Rey et al. |
| 2004/0172358 A1 | 9/2004 | Lent et al. |
| 2004/0177036 A1 | 9/2004 | Nutahara et al. |
| 2004/0181441 A1 | 9/2004 | Fung et al. |
| 2004/0186773 A1 | 9/2004 | George et al. |
| 2004/0193540 A1 | 9/2004 | Brown et al. |
| 2004/0199406 A1 | 10/2004 | Owens et al. |
| 2004/0210498 A1 | 10/2004 | Freund |
| 2004/0210531 A1 | 10/2004 | Barron et al. |
| 2004/0215507 A1 | 10/2004 | Levitt et al. |
| 2004/0215514 A1 | 10/2004 | Quinlan |
| 2004/0225880 A1 | 11/2004 | Mizrah |
| 2004/0230843 A1 | 11/2004 | Jansen |
| 2004/0232223 A1 | 11/2004 | Beenau et al. |
| 2004/0236688 A1 | 11/2004 | Bozeman |
| 2004/0239481 A1 | 12/2004 | Beenau |
| 2004/0243468 A1 | 12/2004 | Cohagan et al. |
| 2004/0243506 A1 | 12/2004 | Das |
| 2004/0249689 A1 | 12/2004 | Naraki et al. |
| 2004/0249710 A1 | 12/2004 | Smith et al. |
| 2004/0249712 A1 | 12/2004 | Brown et al. |
| 2004/0249764 A1 | 12/2004 | Delitz et al. |
| 2004/0252012 A1 | 12/2004 | Beenau et al. |
| 2004/0254991 A1 | 12/2004 | Malik et al. |
| 2005/0004839 A1 | 1/2005 | Bakker et al. |
| 2005/0004864 A1 | 1/2005 | Lent et al. |
| 2005/0006286 A1 | 1/2005 | Fery et al. |
| 2005/0015490 A1 | 1/2005 | Saare et al. |
| 2005/0021363 A1 | 1/2005 | Stimson et al. |
| 2005/0021405 A1 | 1/2005 | Agarwal |
| 2005/0021457 A1 | 1/2005 | Johnson et al. |
| 2005/0023346 A1 | 2/2005 | Bakker et al. |
| 2005/0033619 A1 | 2/2005 | Barnes et al. |
| 2005/0033637 A1 | 2/2005 | Underwood |
| 2005/0035847 A1 | 2/2005 | Bonalle et al. |
| 2005/0040242 A1 | 2/2005 | Beenau et al. |
| 2005/0049965 A1 | 3/2005 | Jen |
| 2005/0055270 A1 | 3/2005 | Broe |
| 2005/0055306 A1 | 3/2005 | Miller et al. |
| 2005/0060579 A1 | 3/2005 | Dickelman et al. |
| 2005/0065877 A1 | 3/2005 | Cleary et al. |
| 2005/0066037 A1 | 3/2005 | Song et al. |
| 2005/0071225 A1 | 3/2005 | Bortolin et al. |
| 2005/0071226 A1 | 3/2005 | Nguyen et al. |
| 2005/0071227 A1 | 3/2005 | Hammad et al. |
| 2005/0071637 A1 | 3/2005 | Shirakawa |
| 2005/0075889 A1 | 4/2005 | Gomes et al. |
| 2005/0077349 A1 | 4/2005 | Bonalle et al. |
| 2005/0080672 A1 | 4/2005 | Courtion et al. |

| | | | | | | |
|---|---|---|---|---|---|---|
| 2005/0080747 A1 | 4/2005 | Anderson et al. | | 2005/0256794 A1 | 11/2005 | Colby |
| 2005/0082362 A1 | 4/2005 | Anderson et al. | | 2005/0256802 A1 | 11/2005 | Ammermann et al. |
| 2005/0086103 A1 | 4/2005 | Agura et al. | | 2005/0261916 A1 | 11/2005 | McCall et al. |
| 2005/0086160 A1 | 4/2005 | Wong et al. | | 2005/0261995 A1 | 11/2005 | Phelan |
| 2005/0086166 A1 | 4/2005 | Monk et al. | | 2005/0267800 A1 | 12/2005 | Tietzen et al. |
| 2005/0086177 A1 | 4/2005 | Anderson et al. | | 2005/0273386 A1 | 12/2005 | Weidner |
| 2005/0091104 A1 | 4/2005 | Abraham | | 2005/0273387 A1 | 12/2005 | Previdi |
| 2005/0091126 A1 | 4/2005 | Junger | | 2005/0273425 A1 | 12/2005 | Yamazaki |
| 2005/0091138 A1 | 4/2005 | Awatsu | | 2005/0278215 A1 | 12/2005 | Seele, Jr. |
| 2005/0091492 A1 | 4/2005 | Benson et al. | | 2005/0278641 A1 | 12/2005 | Mansour et al. |
| 2005/0096976 A1 | 5/2005 | Nelms | | 2005/0283429 A1 | 12/2005 | Bates et al. |
| 2005/0097033 A1 | 5/2005 | Pretell et al. | | 2005/0288998 A1 | 12/2005 | Verma et al. |
| 2005/0102178 A1 | 5/2005 | Phillips et al. | | 2005/0289003 A1 | 12/2005 | Thompson et al. |
| 2005/0108090 A1 | 5/2005 | Takeda et al. | | 2005/0289051 A1 | 12/2005 | Allin et al. |
| 2005/0108102 A1 | 5/2005 | York | | 2006/0004629 A1 | 1/2006 | Neemann et al. |
| 2005/0108151 A1 | 5/2005 | York | | 2006/0005039 A1 | 1/2006 | Hsieh |
| 2005/0114254 A1 | 5/2005 | Condie | | 2006/0010033 A1 | 1/2006 | Thomas |
| 2005/0119938 A1 | 6/2005 | Smith et al. | | 2006/0010034 A1 | 1/2006 | Sparks |
| 2005/0120180 A1 | 6/2005 | Schornbach et al. | | 2006/0011719 A1 | 1/2006 | Lehtonen et al. |
| 2005/0125292 A1 | 6/2005 | Kassab et al. | | 2006/0015463 A1 | 1/2006 | Gupta et al. |
| 2005/0125295 A1 | 6/2005 | Tidwell et al. | | 2006/0020507 A1 | 1/2006 | Sagey |
| 2005/0125296 A1 | 6/2005 | Tidwell et al. | | 2006/0020783 A1 | 1/2006 | Fisher |
| 2005/0125315 A1 | 6/2005 | Munoz et al. | | 2006/0026073 A1 | 2/2006 | Kenny et al. |
| 2005/0125337 A1 | 6/2005 | Tidwell et al. | | 2006/0029261 A1 | 2/2006 | Hoffman et al. |
| 2005/0125338 A1 | 6/2005 | Tidwell et al. | | 2006/0031718 A1 | 2/2006 | Thornhill et al. |
| 2005/0125339 A1 | 6/2005 | Tidwell et al. | | 2006/0036553 A1 | 2/2006 | Gupta et al. |
| 2005/0125350 A1 | 6/2005 | Tidwell et al. | | 2006/0041540 A1 | 2/2006 | Shannon |
| 2005/0125351 A1 | 6/2005 | Tidwell et al. | | 2006/0053056 A1 | 3/2006 | Alspach-Goss et al. |
| 2005/0125360 A1 | 6/2005 | Tidwell et al. | | 2006/0064329 A1 | 3/2006 | Abolfathi et al. |
| 2005/0131721 A1 | 6/2005 | Doctorow et al. | | 2006/0080230 A1 | 4/2006 | Freiberg |
| 2005/0131761 A1 | 6/2005 | Trika et al. | | 2006/0080243 A1 | 4/2006 | Kemper et al. |
| 2005/0131792 A1 | 6/2005 | Rowe | | 2006/0080254 A1 | 4/2006 | Chigira et al. |
| 2005/0137982 A1 | 6/2005 | Michelassi et al. | | 2006/0095350 A1 | 5/2006 | Hall et al. |
| 2005/0144071 A1 | 6/2005 | Monahan et al. | | 2006/0106703 A1 | 5/2006 | Del Rey et al. |
| 2005/0144074 A1 | 6/2005 | Fredregill et al. | | 2006/0116949 A1 | 6/2006 | Wehunt et al. |
| 2005/0144105 A1 | 6/2005 | Czyzewski | | 2006/0122943 A1 | 6/2006 | Mann, III et al. |
| 2005/0144143 A1 | 6/2005 | Freiberg | | 2006/0143077 A1 | 6/2006 | Prorock |
| 2005/0149386 A1 | 7/2005 | Agura et al. | | 2006/0143117 A1 | 6/2006 | Chigira et al. |
| 2005/0149393 A1 | 7/2005 | Leof | | 2006/0149671 A1 | 7/2006 | Nix et al. |
| 2005/0149440 A1 | 7/2005 | Michelassi et al. | | 2006/0161478 A1 | 7/2006 | Turner et al. |
| 2005/0154664 A1 | 7/2005 | Guy et al. | | 2006/0173706 A1 | 8/2006 | Allin et al. |
| 2005/0159986 A1 | 7/2005 | Breeland et al. | | 2006/0249574 A1 | 11/2006 | Brown et al. |
| 2005/0160003 A1 | 7/2005 | Berardi et al. | | 2006/0259766 A1 | 11/2006 | Rasti |
| 2005/0160051 A1 | 7/2005 | Johnson | | 2006/0261927 A1 | 11/2006 | Kelly et al. |
| 2005/0167342 A1 | 8/2005 | Vullriede et al. | | 2006/0271397 A1 | 11/2006 | Allin et al. |
| 2005/0171839 A1 | 8/2005 | Corriere | | 2006/0271477 A1 | 11/2006 | Allin et al. |
| 2005/0171842 A1 | 8/2005 | Tien et al. | | 2006/0271478 A1 | 11/2006 | Allin et al. |
| 2005/0171898 A1 | 8/2005 | Bishop et al. | | 2006/0271479 A1 | 11/2006 | Allin et al. |
| 2005/0171901 A1 | 8/2005 | Rosenblatt et al. | | 2006/0271480 A1 | 11/2006 | Allin et al. |
| 2005/0177503 A1 | 8/2005 | Thomas | | 2006/0274970 A1 | 12/2006 | Seki et al. |
| 2005/0177523 A1 | 8/2005 | Weiss et al. | | 2007/0011089 A1 | 1/2007 | DeSchryver |
| 2005/0182654 A1 | 8/2005 | Abolfathi et al. | | 2007/0019806 A1 | 1/2007 | Conley et al. |
| 2005/0182735 A1 | 8/2005 | Zager et al. | | 2007/0034700 A1 | 2/2007 | Poidomani et al. |
| 2005/0187820 A1 | 8/2005 | Mohan | | 2007/0043681 A1 | 2/2007 | Morgan et al. |
| 2005/0192862 A1 | 9/2005 | Modi | | 2007/0078771 A1 | 4/2007 | Allin et al. |
| 2005/0193056 A1 | 9/2005 | Schaefer et al. | | 2007/0088950 A1 | 4/2007 | Wheeler et al. |
| 2005/0193208 A1 | 9/2005 | Charrette et al. | | 2007/0136211 A1 | 6/2007 | Brown et al. |
| 2005/0197904 A1 | 9/2005 | Baron et al. | | 2007/0156521 A1 | 7/2007 | Yates |
| 2005/0198634 A1 | 9/2005 | Nielsen et al. | | 2007/0179883 A1 | 8/2007 | Questembert |
| 2005/0199708 A1 | 9/2005 | Friedman | | 2007/0186252 A1 | 8/2007 | Maggio |
| 2005/0203824 A1 | 9/2005 | Freud et al. | | 2007/0192618 A1 | 8/2007 | Ellmore |
| 2005/0203857 A1 | 9/2005 | Friedman | | 2007/0203850 A1 | 8/2007 | Singh et al. |
| 2005/0205666 A1 | 9/2005 | Ward et al. | | 2007/0208671 A1 | 9/2007 | Brown et al. |
| 2005/0206499 A1 | 9/2005 | Fisher | | 2007/0215688 A1 | 9/2007 | Routhenstein |
| 2005/0209917 A1 | 9/2005 | Anderson et al. | | 2007/0234408 A1 | 10/2007 | Burch et al. |
| 2005/0216346 A1 | 9/2005 | Kusumoto et al. | | 2007/0234409 A1 | 10/2007 | Eisen |
| 2005/0216421 A1 | 9/2005 | Barry et al. | | 2007/0260706 A1 | 11/2007 | Skingle |
| 2005/0222906 A1 | 10/2005 | Chen | | 2007/0265924 A1 | 11/2007 | Schwarz |
| 2005/0234769 A1 | 10/2005 | Jain et al. | | 2007/0283436 A1 | 12/2007 | Duffield et al. |
| 2005/0234773 A1 | 10/2005 | Hirst et al. | | 2007/0295803 A1 | 12/2007 | Levine et al. |
| 2005/0234789 A1 | 10/2005 | Czyzewski et al. | | 2008/0010202 A1 | 1/2008 | Schwarz |
| 2005/0240474 A1 | 10/2005 | Li | | 2008/0133350 A1 | 6/2008 | White et al. |
| 2005/0240477 A1 | 10/2005 | Friday et al. | | 2008/0177659 A1 | 7/2008 | Lacey et al. |
| 2005/0240916 A1 | 10/2005 | Sandrew | | 2008/0184315 A1 | 7/2008 | Ellis et al. |
| 2005/0242179 A1 | 11/2005 | Warwick | | 2008/0262915 A1 | 10/2008 | Gojkovic et al. |
| 2005/0246289 A1 | 11/2005 | Alexander et al. | | 2008/0320567 A1 | 12/2008 | Shulman et al. |
| 2005/0246627 A1 | 11/2005 | Sayed | | 2009/0043651 A1 | 2/2009 | Schwarz |
| 2005/0251446 A1 | 11/2005 | Jiang et al. | | 2009/0100508 A1 | 4/2009 | Labaton |
| 2005/0251470 A1 | 11/2005 | Sullivan | | 2009/0112639 A1 | 4/2009 | Robinson Beaver |

| | | | |
|---|---|---|---|
| 2009/0150937 | A1 | 6/2009 | Ellis et al. |
| 2009/0171778 | A1 | 7/2009 | Powell |
| 2009/0192940 | A1 | 7/2009 | Mann, III et al. |
| 2009/0228362 | A1 | 9/2009 | Lapsley et al. |
| 2009/0313110 | A1 | 12/2009 | Asai et al. |
| 2010/0057551 | A1 | 3/2010 | Blaisdell |
| 2010/0057553 | A1 | 3/2010 | Ameiss et al. |

FOREIGN PATENT DOCUMENTS

| | | |
|---|---|---|
| DE | 19731293 | 1/1999 |
| EP | 0855659 | 7/1998 |
| EP | 0884877 | 12/1998 |
| EP | 0917119 | 5/1999 |
| EP | 1014318 | 6/2000 |
| EP | 1014318 A2 | 6/2000 |
| EP | 1022664 | 7/2000 |
| EP | 1056043 | 11/2000 |
| EP | 0590861 | 1/2001 |
| EP | 1089516 | 4/2001 |
| JP | 359146347 A | 8/1984 |
| JP | H10-187467 | 7/1998 |
| JP | 11078891 A | 3/1999 |
| JP | 200324329 | 11/2000 |
| JP | 2001134672 | 5/2001 |
| JP | 2005-242976 | 9/2005 |
| WO | WO 97/43736 | 11/1997 |
| WO | WO 98/10368 | 3/1998 |
| WO | WO 98-29822 | 7/1998 |
| WO | WO 99/39291 | 8/1999 |
| WO | WO 99/40507 A1 | 8/1999 |
| WO | WO 99/52051 | 10/1999 |
| WO | WO 00/68858 | 11/2000 |
| WO | WO 01/11526 | 2/2001 |
| WO | WO 01/18656 A1 | 3/2001 |
| WO | WO 01/35355 | 5/2001 |
| WO | WO 01/43084 | 6/2001 |
| WO | WO 01/88659 | 11/2001 |
| WO | WO 0188659 | 11/2001 |
| WO | WO 02/17082 A1 | 2/2002 |
| WO | WO 2004/079603 | 9/2004 |
| WO | WO 2005/101975 | 11/2005 |
| WO | WO 2006/011904 | 2/2006 |
| WO | WO 2006/060370 | 6/2006 |
| WO | WO 2006/105092 | 10/2006 |
| WO | WO 2006/116772 | 11/2006 |

OTHER PUBLICATIONS

Epper, A Player Goes After Big Bucks in Cyberspace, American Banker, vol. 160, No. 86, ISSN: 0002-7561, May 5, 1995, p. 17.
Berry et al., A potent new tool for selling databse, Business Week, Cover Story, Sep. 5, 1994, pp. 56-62.
Alshawi, M et. al., An IFC Web Based Collaborative Construction Computer Environment Wisper.
Applets, java.sun.com, May 21, 1999.
Associates National Bank (DE) Credit Card, The Associates, www.theassociates.com/consumeacredit_cards/main.html , Apr. 6, 1999, 6 pages.
At Your Request, www.wingspanbank.com, Sep. 28, 1999.
Anonymous, Aversion Therapy: Banks Overcoming Fear of the 'Net to Develop Safe Internet-based Payment System w/ Netscape Communicator, Network World, ISSN: 0887-7661, Dec. 12, 1994.
Java, Banking on JAVA(TM) Technology, java.sun.com, May 21, 1999.
Bechtel Construction Operations Incorporated Standardizes on Primavera's Expedition Contract Management Software, Business Wire, Jul. 27, 1999.
Fusaro, Roberta, Builders Moving to Web tools Computerworld, Nov. 16, 1998, vol. 32, No. 46, pp. 51, 53.
Anonymous, CORBA Overview, arch2.htm at pent21.infosys.tuwien.ac.at, May 25, 1999.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Bank, Cash, Check,Charge—What's Next?, Seattle Times, Mar. 6, 1995.
Marlin, Chasing Document Management, Inform, vol. 13, No. 4, Apr. 199, p. 76-82.
Consortium Created to Manage Common Electronic Purse Specifications, http://www.visa.com/av/news/PRmisc051199.vhtml, printed Feb. 23, 2001.
Construction Financing to Build Your Own Home, ISBN: 0962864307, Jul. 1990.
Civitello JR., Construction Operations Manual of Policies and Procedures, Third Edition, 2000.
Marchman, Construction Scheduling with Primavera Project Planner, May 25, 1999.
Chester, Cross-platform integration with XML and SOAP, IT PTO Sep.-Oct. 2001.
Mitchell, Cyberspace: Crafting Software . . . , Business Week, Feb. 27, 1999, pp. 78-86.
Friedman, Dictionary of Business Terms, Barron's Third Edition, Copyright 2000.
Strassel, Dutch Software Concern Experiments with Electronic 'Cash' in Cyberspace, The Wall Street Journal, Apr. 17, 1995.
Post, E-Cash: Can't Live With It, Can't Live Without It, The American Lawyer, Mar. 1, 1995, pp. 116-117.
Thomas, Enterprise JAVABEANS(TM) Technology: Server Component Model for the Java(TM) platform, java.sun.com, May 2, 1999.
Seibert, Paul, Facilities Planning & Design for Financial Institutions Bankline Publications, 1996, ISBN: 1-55738-780-X.
Owens, David, Facilities Planning & Relocation RSMeans, 1993, ISBN: 0-87629-281-3.
Maize, Fannie Mae on the Web, Doucment ID: 52079, May 8, 1995.
FreeMarkets, printed on Apr. 26, 1999.
The Gale Group, G&D America's Multi-application Smart Card Selected for Combined Payroll and 'Virtual Banking' Program in Mexico, Business Wire, Apr. 24, 1998, p241047.
Getting Smart with Java: Sun Micro Says American Express to Use Java for Smart Card, ABCNews.com, printed on Jun. 6, 2000.
Getting Started: Specific GE TPN Post Service Use Guidelines, printed on Apr. 26, 1999.
Harris, Harris InfoSource, printed on Apr. 26, 1999.
Knowles, Improved Internet Security Enabling On-Line Commerce, PCWeek, vol. 12, No. 11, ISSN: 0740-1604, Mar. 20, 1995.
Meredith, Internet bank moves closer to virtual reality, USA Today, May 5, 1995.
Larsen, Amy, Internet goes to Work for Builders, InterWeek, Nov. 16, 1998, Issue 741.
Radosevich, Is Work Flow Working?, CNN.com, Apr. 6, 1999 at <http://www.cnn.com/TECH/computing/9904/06/workflow/ent.idg, p. 1 of 5, retrieved from the internet on Nov. 28, 2005.
JAVA, JAVA (TM) Technology in the Real World, java.sun.com, May 21, 1999.
JAVA, JAVA(TM) Remote Method Invocation (RMI) Interface, java.sun.com, 05/32/1999.
Java, Java(TM) Servlet API, java.sun.com, May 21, 1999.
Frank, John N. Frank, Beyond Direct Mail, Credit Card Management, vol. 9, Iss. 5, Aug. 1996, 4pgs.
OMG, Library, www.omg.com, May 25, 1999.
Mary C. Lacity, et al., Mary C. Lacity, et al., The Information Systems Outsourcing Bandwagon, Sloan Management Review, vol. 35, No. 1, Fall 1993, p. 73-86.
Method of Protecting Data on A Personal Computer, IBM Corporation, TDB 11-85, Order 85A 62426, Nov. 1, 1995, p. 2530.
Clark, Microsoft, Visa to Jointly Develop PC Electronic-Shopping Software, The Wall Street Journal, Nov. 9, 1994, WSJ B9.
Sirbu, et al, NetBill: An Internet Commerce System Optimized for Network Delivered Services, printed on Feb. 27, 1995.
Mitchell, Netlink Goes After An Unbanked Niche, Card Technology, ISSN: 1093-1279, Sep. 1999, p. 22.
Barnham, Network Brings Together Producers and Companies, Document ID: 17347.
Houlder, OFT Gives the Individual Top Priority: Report Calls for Deregulation of Business Lending, Document ID: 91716, Jun. 8, 1994.
OMWARE, Inc., Web Pages, Feb. 2000, Retrieved from http://web.archive.org/web20000226033405/www.omware.com/products.html, Retrieved from the interneet on Nov. 28, 2005.

Anonymous, Overview of CORBA, May 25, 1999.
Harris, Planning Using Primavera Project Planner P3 Version 3.0, User Guide, Copyright 1999 by Eastwood Harry Pty Ltd., 1999.
Point for Windows Version 3.x Interface Marketing Guide.pdf.
Johnston, Pondering Passport: Do You Trust Microsoft With Your Data?, www.pcworld.com/resource/printable/article/0. aid,63244,00.asp, Sep. 24, 2001.
Primavera Expedition User Guide.
Primavera Systems Delivers Expedition Express,Business Wire, Feb. 23, 1999.
Primavera Systems, Inc.—How the World Manages Projects, Expedition Contract Control Software, www.primavera.com, Jun. 23, 2005.
Primavera and PurchasePro.com to Create E-Commerce Marketplace for Construction Industry, Primavera Ships P3, version 3.0, www.purchasepro.com/, Sep. 21, 1999, pp. 1-3.
Van Collie, Shimon Craig, Problem Disbursement Control Needed Construction Loan Tool from PriMerit NewTrend.
Product Data Integration Technologies, Inc., Step Integratin Authors, printed on Apr. 26, 1999.
Resource Center: Consolidated Edison Selects GE TPN Post, printed Apr. 26, 1999.
Kormann, Risks of the Passport Single Signon Protocol, Computer Networks, Elsevier Science Press, vol. 33, Sep. 20, 2003, pp. 51-58.
SBA: Pro-Net, U.S. Small Business Administration Procurement Marketing and Access Network, Last Modified: Apr. 1, 1999.
Jepsen, SOAP Cleans up interoperability problems on the web, IT PTO, Jan./Feb. 2001.
Safe Single-Sign-On Protocol with Minimal Password Exposure No Decryption and Technology Adaptivity, IBM Corporation, TDB Mar. 1995, Order 95A, Mar. 1, 1995, pp. 245-248.
Deckmyn, Dominique, San Francisco manages $45M project via web-based Service, Computerworld, Aug. 9, 1999, vol. 33, No. 32, p. 14.
Sun Microsystems, Inc., Schema for Representing CORBA Objects in an LDAP directory, May 21, 1999, pp. 1-9.
Jakobsson et al., Secure and lightweight advertising on the web, Computer Networks, 31 (1999) 1101-1109.
Servlet/Applet/HTML Authentication Process with Single Sign-On, IBM Corporation, IBM Order: 00A6004, Jan. 1, 2000.
Shibata, Seventh International Conference on Parallel and Distributed Systems: Workshops, IEEE Computer Society, Jul. 4-7, 2000.
Siebel, Siebel: Ensuring Customer Success, www.siebel.com, Nov. 17, 1999.
SmartAxis, How it works, http://www.smartaxis.co.uk/seller/howitworks.html, printed on Feb. 23, 2001.
Mosig, Richard, Software Review: the Construction Project Manager Cost Engineering, Jan. 1996, vol. 38, No. 1, pp. 7-8.
Hernandez, Tomas et al., Software Solutions Building Design & Construction, Nov. 1999, vol. 40, No. 11, pp. 38-40.
Thomas Publishing Company, SoluSource: For Engineers by Engineers, Thomas Publishing Company, Apr. 26, 1999.
JAVA, Staying in Touch with JNDI, java.sun.com, May 21, 1999.
Summary of the at Your Request Architecture, First USA Bank Confidential and Proprietary, Apr. 2, 1999, pp. 1-8.
Taylor, Telecommunications Demand Analysis in Transition, Proceedings of the 31st Hawaii International Conference on System Sciences, vol. 5, Jan. 6-9, 1998, pp. 409-415.
Temporary Global Passwords, IBM Corporation, IBM TDB v36, n3, Mar. 1993, Order 93A 60636, Mar. 1, 1993, pp. 451-454.
Brown, Keith, The Buiders Revolution.
Cotts, David, The Facility Management Handbook Second Edition AMACM, 1998, ISBN: 0-8144-030-8.
JAVA, The JDBC(TM) Data Access API, java.sun.com, May 21, 1999.
Carden, Philip, The New Face of Single Sign-on, Network Computing, http://www.networkcomputing.com, printed Dec. 29, 2000, 4 pages.
The check is in the email, Information Today, vol. 12, No. 3, ISSN: 8755-6286, 03/01995.
Thomas Publishing Company, ThomasNet, Apr. 26, 1999.
Ritz, Total Construction Project Management, McGraw-Hill, 1994.
Hewlett-Packard Company, Understanding Product Data Management, Hewlett-Packard Company.
Welcome to MUSE, Apr. 26, 1999.
OMG, Welcome to OMG's CORBA for Beginners Page!, www.omg.co, May 25, 1999.
OMG, What is CORBA?, www.omg.com, May 25, 1999.
Fujimura et al., XML Voucher: Generic Voucher Language, Feb. 2003.
eCharge, eCharge Corporation, www.echarge.com, Dec. 3, 1999.
Brown, The Builders Revolution, BuildNet Publishing Division, Jan. 1996, ISBN 096493390x.
Butterworth 'Automating the Business Process of Mission Critical Distributed Applications', Forte Software, Inc.; Apr. 1997.
Calyx Software, Point for Windows Version 3.x Interface Marketing Guide, Rev. Dec. 8, 1999.
Definition of 'Opt Out', Wiktionary, (http://en.wiktionary.org/wiki/opt_out), Aug. 18, 2008 (1 page).
Hasting et al., A Case Study of Authenticated and Secure File Transfer the Iowa Campaign Finance Reporting System (1997).
Kilian-Kehr, Mobile Security with Smartcards, Dissertation, Apr. 8, 2002.
Kristol, HTTP Cookies Standards, Privacy, and Politics, ACM Transactions on Internet Technology, vol. 1, No. 2,p. 151-198, Nov. 2001.
Li et al., Combined Coherence and Prefetching Mechanisms for Effective Web Caching, IEEE, p. 3034-3038, 2001.
Microsoft, CNBC On MSN Money Microsoft Money 2003 Deluxe (2003).
Muse Technologies, Leading the New Age of Perceptual Computing, Apr. 26, 1999.
Myers, The Wired World of Investment Information, Nation's Business, Washington, vol. 85, Iss. 3, p. 58, Mar. 1997.
Nelte et al., Cookies Weaving the Web into a State, Crossroads, vol. 7, Issue 1, ACM Press, Fall 2000.
Nowlin, Construction Financing to Build Your Own Home, First Edition, Jerry L. Nowlin Consulting, Inc., ISBN 0962864307, Jul. 1990.
The Check is in the Email, Information Today, vol. 12, No. 3, ISSN 8755-6286, 03/01995.
Yee, Bennet, Using Secure Coprocessors.
Youll, James, Peer to Peer Transactions in Agent Mediated Electronic Commerce.

* cited by examiner

SYSTEM AND METHOD FOR PROVIDING DISCRIMINATED CONTENT TO NETWORK USERS

FIELD OF THE INVENTION

The present invention relates to a method for providing customers with transparent access to information from various partnered service providers while maintaining an environment of a single service provider.

BACKGROUND OF THE INVENTION

Various service providers often form business alliances or partnerships in which one service provider will "brand" its services to match the appearance or message of a partner's service. An example of such a relationship is branded credit cards, which are issued by one service provider, but are branded to present the name or logo of another service provider. In such a relationship, the two service providers typically operate within related, but non-overlapping market sectors. The partnership provides mutual benefits to both service providers, because whenever a customer uses the branded services, both partners are involved in the transaction, and the customer can be said to be using both services in unison. In addition, branded services bolster customer loyalty to both service providers.

Service providers are increasingly turning to the Internet, or World Wide Web ("Web"), as an additional outlet for providing their services. In the Internet context, a customer of the service provider accesses the service provider's services using a networked computer. The customer typically must "log in" to a service provider's system by submitting login data (usually a user name and password) to verify the customer's identity. If the user name and password are approved, then the customer may access the service provider's system resources during the ensuing login session. The login session ends after the customer stops using the resources for a predetermined period of time, or when the customer triggers a "log off."

A customer of one Internet-based service provider may wish to access resources provided by a second Internet-based service provider. In the context of the Web, the service providers host websites (also called "sites," "web pages," or simply "pages") that present an easily accessible user interface between a user and the service provider. The current inter-page access model is to "jump" from one service provider's website to the next using graphically selected hyperlinks, by typing a destination site, or by other means. Each different provider typically requires a different login data set, so in order to switch from one provider to another, the customer must enter the login data associated with the next provider. This can be a cumbersome process, as the customer must memorize or record many different sets of login data.

Several methods are known for reducing the inconvenient process of logging in to multiple service providers. These systems allow the customer to operate within a "Single Sign On" (SSO) environment. The SSO provides "seamless" or "transparent" access between Internet resources wherein the customer only has to log in once to access all of the service providers with which he has an account. Once logged in, the customer may jump from website to website without having to re-enter login information.

The SSO's provided by the prior art use a traditional inter-page access model, in which a user of one page simply jumps from one website to the next without experiencing any inter-site interconnectivity. Although each website may have related or similar-looking pages, each separate website may have differences in appearance and functionality. Under the current inter-page access model, the content of one service provider's website is typically uninfluenced by and unrelated to the content of previously visited service providers' websites. This is typically true even when the service providers have a business partnership. This type of inter-page access is "non-discriminatory" in that when a customer requests a second web page, neither the owner of the first web page nor the owner of the second web page discriminates whether there is a relationship between the first and second web page owners.

A drawback with the current non-discriminatory inter-page access system is that it can have a negative impact on business partnerships. For example, a customer may have a credit card that is provided by a bank, but that is branded with the markings of a stock broker as part of a business relationship between the bank and the stock broker. In addition, the bank and the stock broker may each have an Internet website. When the customer accesses the stock broker's website to make a stock transaction, he or she may wish to check his stock broker-branded credit card account. Using conventional inter-page access, when the customer rag accesses the bank's website the customer will see an entirely different web page, which may not appear to be affiliated with the stock broker at all. This lack of brand continuity can weaken the customer's inclination to use the two service providers in unison, and may lead to customer confusion.

Conventional SSO systems do nothing to solve this problem. Although there is continuity of access between the websites, which is provided by the SSO system, there is a discontinuity between the service providers because the branded relationship between the two service providers does not exist in the web context.

In addition to weakening the customer's brand association and loyalty, non-discriminatory inter-page access between service providers can also directly interfere with business partnerships by providing conflicting services to customers. A central service provider may have a partnership with many partner service providers that compete against one another in the same market. To continue with the above example, a single credit card issuer may offer various stock broker-branded credit cards pursuant to partnerships with several competing stock brokers. The credit card issuer may wish to advertise the availability of all of these different stock broker-branded credit cards to potential customers on its website. When a customer accesses the credit card issuer's website by way of a link on his selected stock broker's website, he will see advertisements for the services of competing stock brokers. An individual stock broker would be opposed to presenting advertisements for its competitors' services to customers who have already become affiliated with that stock broker, and this would create a disincentive to enter into a business partnership with the credit card provider. Although such advertising may be beneficial to the credit card provider, it would, in effect, facilitate competition between the various stock brokers, which may strain the business relationship between the partnered companies.

The problems presented by the traditional inter-page access model increase as the complexity of the business partnerships increases. These problems also increase as users of various service providers employ SSO systems to obtain seamless access to various service providers. In the developing environment of the Internet, users may become less loyal to partnered groups of services because these partnerships are very hard to distinguish. Other problems with conventional inter-site access and SSO systems exist.

It would therefore be desirable to provide a system and method of providing discriminated system resources to users of multiple partners' systems, and to provide other improvements.

SUMMARY OF THE INVENTION

The present invention addresses these and other problems caused by traditional non-discriminatory access to multiple service providers and other systems and methods of Internet access. The present invention, in one regard, provides a method and system for providing discriminated system resources to a user during a single login session.

The system and method of the present invention help maintain continuity of appearance and message between visited websites, provide a secure connection between websites, and assist in fostering business partnerships.

In an embodiment of the present invention, a partner system receives a request to access system resources that are provided by the partner system from a host system, which is being used by a user who has logged in to the host system. In addition to this request, the partner system receives host system data and user data. Using the received data, the partner system identifies the host system and the user and determines whether access to the partner system resources is authorized. If access is authorized, then the partner system selects discriminated partner system resources that are associated with the particular host and the particular user and transmits those resources to the host system, the user, or both the host system and the user.

Various techniques for selecting discriminated partner system resources may be used with the present invention. In one embodiment, the partner system identifies the user's partner system account information, selects a predetermined web page that is associated with the host system, and integrates these into a discriminated host system resource. In another embodiment, the partner system modifies an existing web page to create a new discriminated web page which imitates the graphical appearance of the host system's web page and incorporates information that does not conflict with the host's business into the discriminated host system resource.

In a second method, the host system receives user data, such as a user name and password, from a user and determines whether the user is authorized to use the host system. If the user is authorized to use the host system, the host system provides the user with host system resources. The host system resources include an option to access partner system resources, which may be in the form of a hyperlink. When the user requests access to partner system resources, the host system transmits some or all of the user data to the partner system, along with host data that uniquely identifies the host.

The partner system then transmits the partner system resources to the host system. If the partner system resources are discriminated, then the host system forwards them to the user. If the partner system resources are not discriminated, then the host system discriminates the partner system resources according to the host's requirements before sending them to the user. Such discrimination may be in the form of adding, removing, or manipulating information that is being provided by the partner system.

A system is also provided for carrying out the above methods. The system comprises instructions for carrying out the steps of the methods of the invention.

BRIEF DESCRIPTION OF THE DRAWINGS

The present invention may be better understood when described in conjunction with the following exemplary figures.

DETAILED DESCRIPTION OF THE EMBODIMENTS

Figure 1:
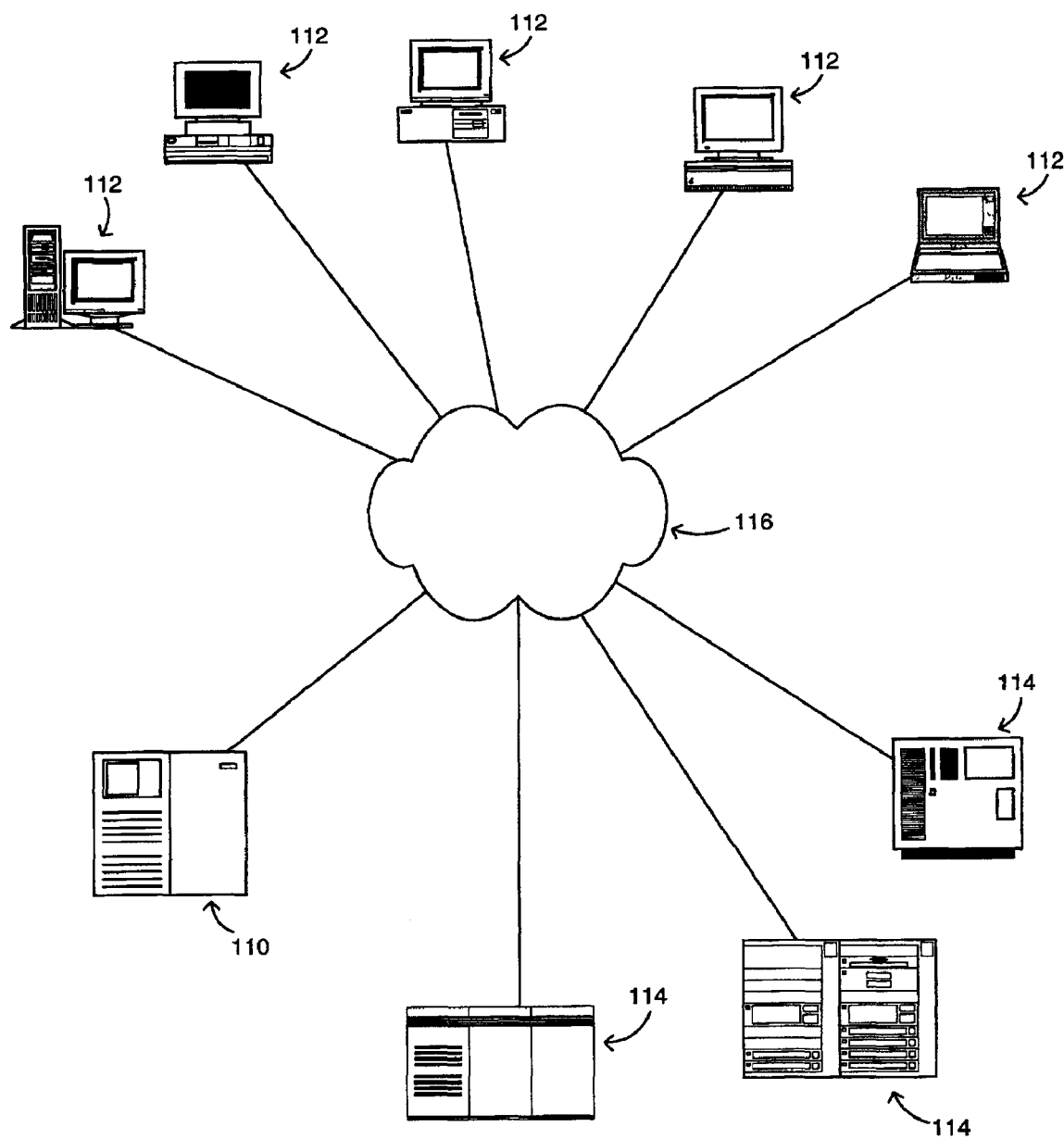
FIG. 1 is a depiction of an embodiment of a networked communication system of the present invention.

The present invention provides discriminated system resources to a user. In general, a user accesses a system provided by one of two or more partnered entities, then requests to access information or resources provided by another of the partnered entities. At this point, the partner through which the user makes this request becomes the host. These resources may include any information transmitted over a communication network, such as financial information, advertising, special offers, news items, press releases, hyperlinks, or any other information or promotional material related to a user, host, partner or third party. In addition, the specific resources sought by the user may comprise only a portion of the total resources that will be made available to the user as a result of the request.

These resources supplied by the partners are discriminated. Discrimination is performed supplementing, modifying, filtering, or otherwise selectively retrieving resources to support and bolster the business relationship between the partners and provide other benefits to the partners, a user, third parties, or all of these entities. Different criteria for discrimination may be used between each pair of partners. For example, one partner, when acting as a host, may discriminate against advertisements for goods or services competing with that partner's services, but allow other information to be provided in an unmodified form. Discrimination may also include modifying the partner system resources to comport with the host system's requirements. For example, the partner system resources may be "branded," either by the partner or the host, so that they appear to be provided by the host system. This may be accomplished by using specific color schemes, text fonts, by incorporating specific graphical images or by other means.

The invention is generally described in terms of an Internet-based credit card provider partnered with several other Internet-based service providers. However, it should be appreciated that this embodiment is exemplary only and that the invention is applicable in any situation where an Internet-based entity wishes to maintain continuity of appearances with a partnered Internet-based entity. "Partner" herein means any entity that provides goods or services by means of a communication network, and that is in a business relationship with other partner entities. "User" herein means any entity that is a consumer or user of the goods or services provided by more than one partner. When a user accesses the services of a partner, that partner becomes the "host" for the ensuing login session relative to any partners accessed directly from that "host." Thus "host" and "partner" are relative terms, and a host in one situation may be a partner in another situation, depending on which partner the user accesses first. A partner to one host may also be a host relative to any partners accessed through that partner's system. For clarity, a single partner system has been selected as an exemplary host, and another single partner has been selected as an exemplary partner, however this is not intended to limit the present invention. Herein, a "system" means any means for accessing and communicating through a communication network, storing information, or maintaining system resources.

Also, for illustration purposes only, the invention is described in terms of the existing Internet. It should be appreciated, however, that the present invention could be implemented through a variety of networks such as a telephone network, a satellite or cellular connection network, an electro-optical network, or any other communication network. The skilled artisan will also recognize that the invention could be implemented in variations of networks, such as the so-called Internet Protocol Next Generation (IPng) or any other variations of networked packet-switched or other technology.

The methods of this invention may be embodied into a system. Such a system may use suitable computer systems or combinations of computer hardware and computer software. As indicated herein, a system of the present invention may be practiced using a networked communication system. FIG. 1 depicts an embodiment of a system of the present invention that is operated over a networked communication system. A host system 110 is connected to a multitude of user systems 112 and partner systems 114 through an intercommunication means 116, such as the Internet, a local area network ("LAN"), or a wide area network ("WAN"). The host system 110 and each of the partner systems 114 provides system resources to user systems 112 having access to the host and partner systems 112, 114 using the same intercommunication means 116. As noted herein, any of the partner systems 114 may act as the host system 110 depending on the sequence in which the systems are accessed by the user systems 112.

Those skilled in the art should appreciate that computer-operable programs defining the methods and functions described herein can be delivered to a computer in many forms; including, but not limited to: (a) information permanently stored on non-writable storage media (e.g., read only memory devices within a computer or CD-ROM disks readable by a computer I/O attachment); (b) information alterably stored on writable storage media (e.g., floppy disks and hard drives); or (c) information conveyed to a computer through communication media such as telephone networks. It should be understood, therefore, that such media, when carrying such information, represent alternate embodiments of the present invention.

The system resources provided by the host system 110 and the partner systems 114 may be any information that is useful to the host, partner, or user. In one embodiment, these resources comprise information such as financial information regarding the users of the user systems 114. In another embodiment of the invention, these resources comprise non-financial information such as news, advertisements, and graphical information. In yet another embodiment, these resources comprise incentive reward information, such as frequent flyer mile account data. These resources may also be a combination of the above embodiments, and may include other information. Each partner system 114 and host system 110 may store these resources on its own system, or on other systems to which it has access.

In one embodiment, the host system 110 is an Internet website maintained by a partner that may be a provider of services or goods, such as a stock brokerage, and the partner systems 114 are websites maintained by business partners of the host who may be providers of related goods or services, such as a credit card provider that offers credit cards branded with the host's logo. Internet websites are generally known in the art, and a skilled artisan will be able to implement such websites in conjunction with the present invention.

Figure 2:
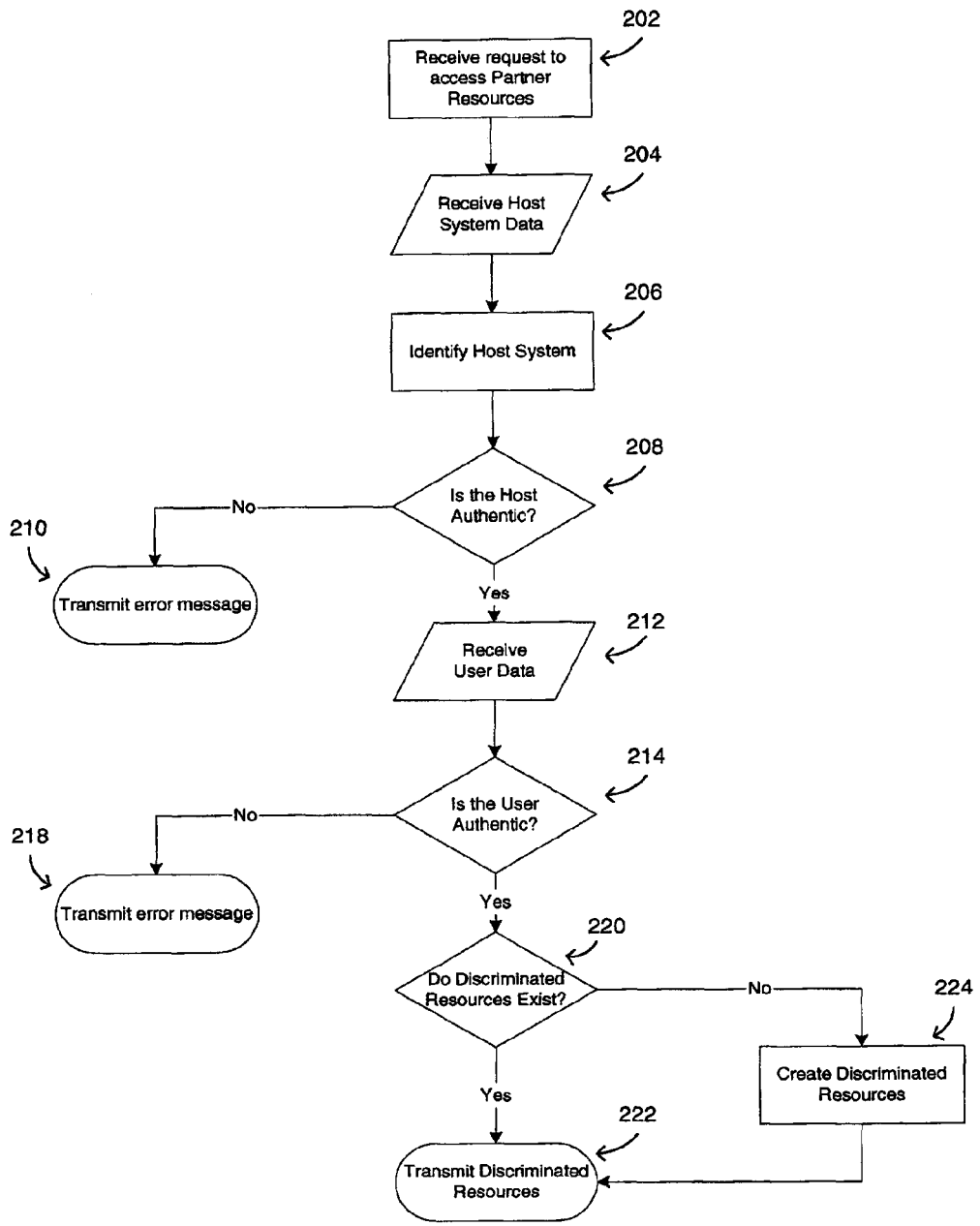
FIG. 2 is a flowchart demonstrating the steps of one embodiment of a method of the present invention.

Referring now to FIG. 2, an embodiment of a method for providing discriminated partner system resources to a user system 112 is described. The method illustrated in FIG. 2 depicts the embodiment as it is performed by a partner system 114. The method will generally comprise a user system 112 being operated by a user who has already logged in to a host system 110, and now wishes to access partner system resources. The initial login is performed when the user logs in to the host system 110, and no additional logins should be required. The method begins when a partner system 114 receives a request to access partner system resources 202 from a host system 110. In one embodiment of the invention this happens when a user, who is logged in to the host system 110, selects a hyperlink on the host's website that corresponds to the partner's website. This correlation may be apparent to the user or concealed. For example, an apparent correlation would exist if the website displayed a hyperlink stating "Check your [Name of partner system] account." In such a case, users would likely understand that they were about to receive resources from a different entity; specifically, the partner system 114. IN an embodiment using a concealed correlation, the web page may display a hyperlink simply stating "Check your credit." In this case, the user may or may not know that his credit information will be received from a separate entity.

Before providing partner system resources to the host system 110, the partner system 114 receives host system data 204. The partner system 114 uses the host system data to identify the host 206 so that the correct discriminated partner system resources may be transmitted to the host system 110 of the user system 112.

The host system data may be also used for additional purposes. In one embodiment of the invention, the partner system 114 uses the host system data to determine whether the entity accessing the partner system 114 is an authorized host 208. This verification process prevents unauthorized access, use, or manipulation of the partner system resources. In one embodiment, the partner system 114 receives host system data 204 from the host system 110, with which the partner system 114 can positively identify the host system 206. For example, the host system 110 may send an identification code to the partner system 114, which the partner system 114 compares to a database of host identifiers. As another example, the host system 110 may access the partner system 114 through a portal designated specifically for use by that host system 110, in which case the partner system 114 identifies all communications through that portal as being from a particular business host. The partner system 114 may also require independent verification of the host system's identity before proceeding. Such verification systems are known in the art, and a skilled artisan will be able to implement a verification system without undue experimentation. If the partner system 114 fails to identify the host system 110 as an authorized host, then the partner system 114 will not transmit partner system resources and may transmit an error message 210.

The partner system 114 also receives user data 208. The partner system 114 uses the user data to identify the user 214 so that the partner system 114 can locate the particular partner system resources associated with that user for transmittal. The partner system 114 may also require user authentication to ensure that the user is not an impostor. In order to provide seamless access to the partner system resources, however, the user of the user system 112 should not have to provide any input during this authorization step. Seamless user authorization may be accomplished by employing any number of existing Single Sign On (SSO) systems. One such system is discussed in U.S. patent application Ser. No. 09/591,687, filed by Rosko et al., which is hereby incorporated by reference for all purposes and in a manner consistent with the present invention. Another solution is provided by U.S. Pat. No. 5,684,950 issued to Dare et al. Such solutions may provide a universal database of correlated user names and passwords to which all of the partners have access, or may have a trusted third party or authentication server verify the user's identity. Other SSO systems may provide for a universal session manager to control login operations. The present invention may employ these or any other means for seamless access provided by the art. Preferably, when the seamless access system will provide "secure" access to the various systems, that is, a level of security between websites, such that the risk of data theft, loss, or damage is substantially reduced compared to unsecured access systems. Regardless of the particular SSO employed to authenticate the user, the partner system 114 determines whether the user is an authentic user 216, and if the user is not properly authenticated, the partner system 114 will not provide partner system resources and it may transmit an error message 218.

After the host and user have been successfully identified and authorized, the partner system 114 determines whether discriminated resources exist 220. Existing discriminated resources may comprise, for example, a pre-established web page that is specifically designated for that particular host and bears that host's indicia and color schemes, as well as other information that may be approved by the host or consistent with the host's business. Existing discriminated resources may also comprise financial account data for a particular user. If discriminated resources exist, then the partner compiles the resources, such as by populating a host-specific web page with a user's financial information, and transmits the discriminated resources 222.

If discriminated resources do not exist, then in one embodiment, the partner system 114 may create discriminated resources 224. The partner system 114 may create discriminated resources in a number of ways. In one embodiment, the partner system 114 identifies graphical information regarding the host system's web page and recreates this information when transmitting the partner system resources, providing the appearance, to the user, that the discriminated resources originated from the host system 110. For example, the partner system 114 may analyze the color schemes, shapes, sizes, and brand labels of a host's website, then incorporate these into the discriminated partner system resources. Such analysis may be facilitated by providing for a universal language or decoding key to be used by all of the partners. In another embodiment, the partner system 114 identifies and selects discriminated resources from a larger pool of resources according to a previously established agreement between the host and the partner. For example, the host and partner may agree that certain classes of resources, such as particular types of advertisements, may be transmitted, but others may not. In one embodiment, the partner system 114 classifies each host system 110 according to that host's type of business, selects advertisements that do not compete with that host's type of business, and incorporates these advertisements into the discriminated partner system resources.

Figure 3A:
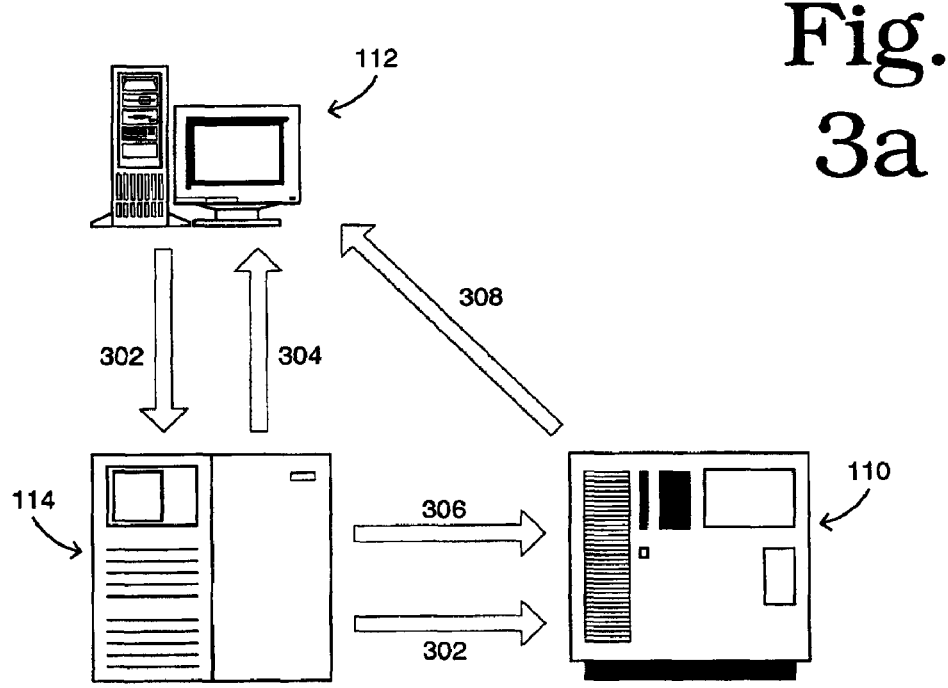
FIG. 3a is a schematic depiction of an embodiment of the invention in which the partner system transmits discriminated partner system resources directly to a user.

The partner system 114 transmits the discriminated partner system resources 222 to either the host system 110 or to the user system 112. FIG. 3a schematically depicts an embodiment of the invention in which the partner system 114 transmits the discriminated partner system resources directly to the user system 112. In the embodiment of FIG. 3a, the user system transmits user data 302 to the host system 110, and receives host resources 304 directly from the host system 110. When the user system 112 instructs the host system 110 to retrieve partner system resources from the partner system 114, the host system 110 transmits host data 306 and all or part of the user data 302 to the partner system 114. Upon approval of the host system 110 and the user and location or creation of discriminated partner system resources, the partner system 114 transmits the discriminated partner system resources 308 to the user system 112 for viewing by the user.

Figure 3B:
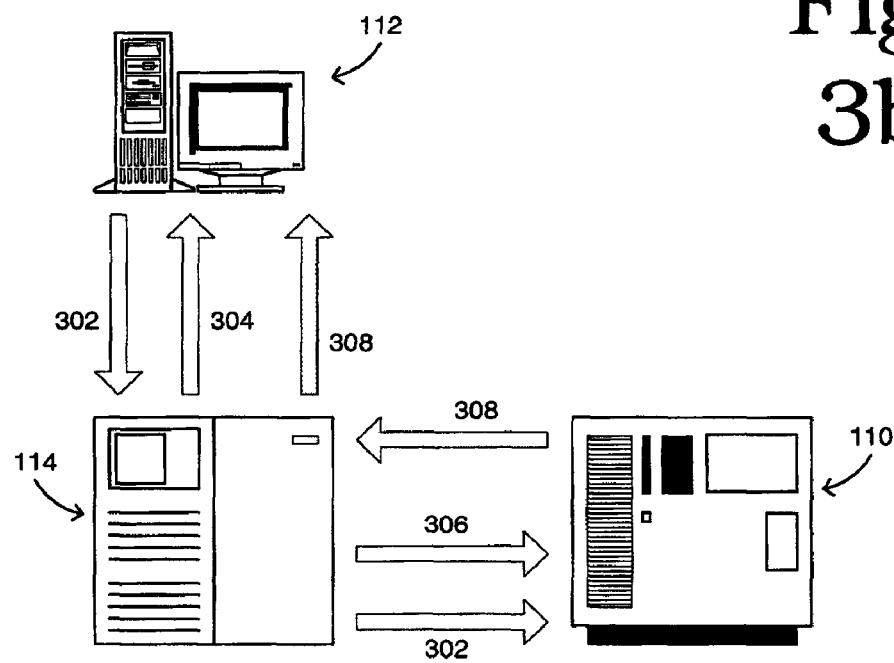
FIG. 3b is a schematic depiction of an embodiment of the invention in which the partner system transmits discriminated partner system resources to a host system, which then transmits discriminated partner system resources to a user.

In another embodiment, depicted schematically in FIG. 3b, the partner system 114 transmits the discriminated partner system resources 308 to the host system 110, which then transmits them to the user system 112 to be viewed by the user. In this embodiment, the host system 110 may perform further discriminating functions on the partner system resources by adding, modifying, or removing information.

The discriminated partner system resources may be displayed to the user in a number of ways. In one embodiment, in which the user accesses the host and partner systems 110, 114 through a computer terminal attached to the Internet, the discriminated partner system resources are displayed on a separate web browser "window" that is invoked when the user requests access to the partner system resources. In another embodiment, the discriminated partner system resources are displayed in a frame within the same web browser window that displays the host system resources. The host system resources and the discriminated partner system resources may be viewed simultaneously, or they may be viewed separately. In a preferred embodiment, the user may seamlessly move back and forth between views of the host system resources and the discriminated partner system resources.

Figure 4:
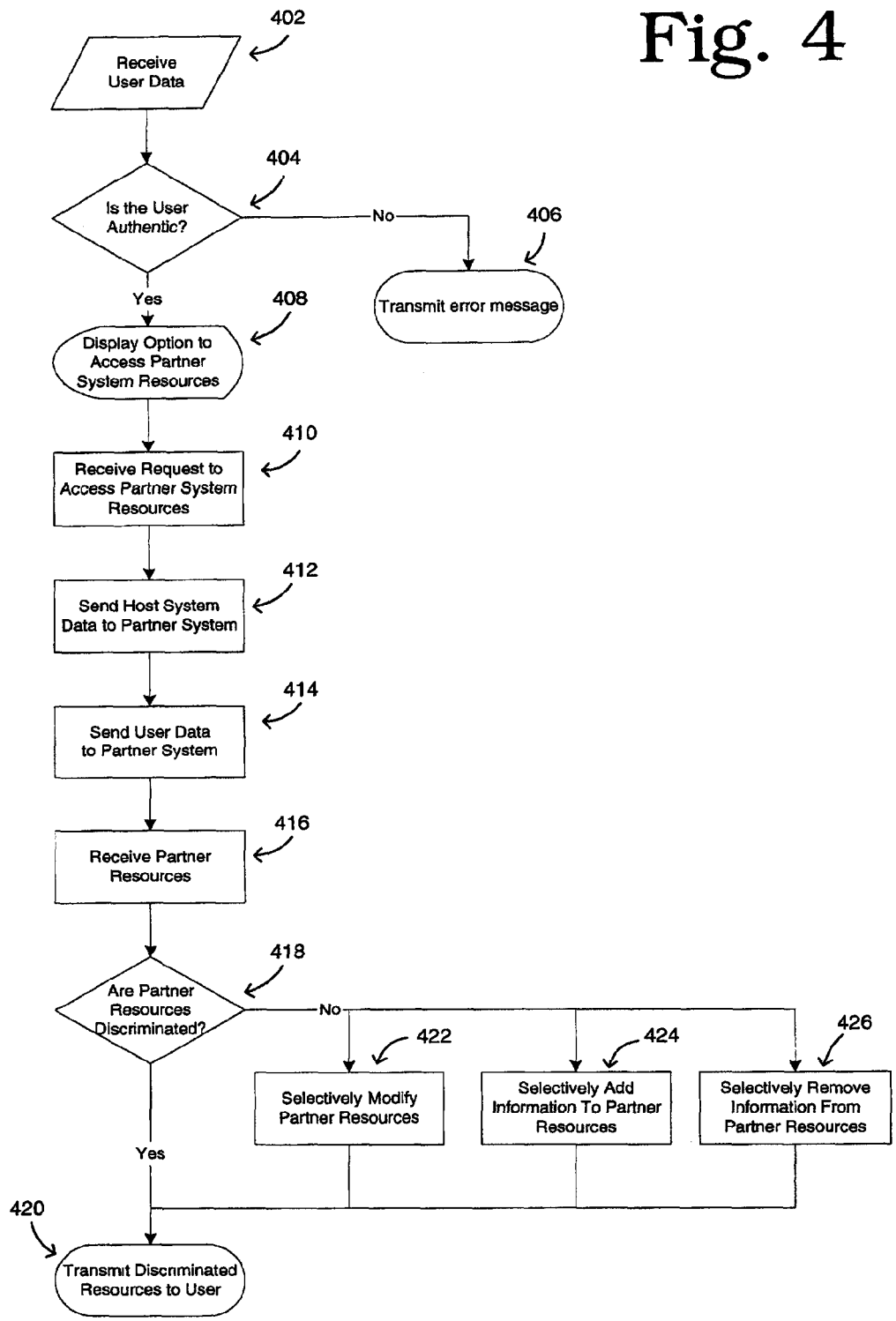
FIG. 4 is a flowchart demonstrating the steps of another embodiment of a method of the present invention.

Referring now to FIG. 4, another embodiment of a method for providing discriminated partner system resources to a user system 112 is provided. The method illustrated in FIG. 4 depicts the embodiment as it is performed by a host system 110. In this embodiment, the user transmits user data to the host system 402, which the host system 110 uses to determine whether the user is authentic 404. The user data may be manually entered by the user, retrieved from storage on a fixed storage medium, such as a computer hard drive, or stored on a portable storage device, such as a magnetic card or other storage medium. The user data may also comprise biometric information inherent to the user, such as a retinal image. Any other suitable user data transmittal scheme may be used. The user may access the host system 110 from any networked terminal, such as a home computer or a public computer kiosk.

Authentication procedures have been described herein, and any suitable authentication process may be used. If the host system 110 determines that the user is not an authentic user, the host system 110 will not transmit host resources to the user and may transmit an error message to the user 406. If the host system 110 determines that the user is an authentic user, then it will transmit host system data to the user. Among this data will be an option to access partner system resources 408. This option may or may not indicate to the user that, by selecting the option, the user will be provided with resources originating from somewhere other than the host system 110.

If the user requests partner system resources 410, the host system 110 attempts to retrieve partner system resources from the partner system 114. The host system 110 sends host system data 412 and all or part of the user data 414 to the partner system 114. The user data and host system data transmitted to the partner server may comprise information necessary to identify the user and the host system 110, and may further comprise information necessary to authenticate the user and the host system 110. In one embodiment, the host system 110 provides the partner system 114 with information that has been received from a third-party authentication server. Such authorization methods are known in the art, and any suitable method may be used with the present invention to provide the user with seamless access to host and partner system resources.

The host system 110 then receives partner system resources 416 from the partner system 114, and determines whether the partner system resources are discriminated in a manner acceptable to the host system 418. If the partner system resources are discriminated in a manner acceptable to the host system 110, then the host system 110 transmits the partner system resources to the user system 420 to be viewed by a user. If the partner system resources are not suitably discriminated, the host system 110 may create discriminated resources by modifying the partner system resources 422, or adding to the partner system resources 424. For example, a host system 110 may modify the color scheme of a web page received from a partner system 114 to match the host's web page, and may also add extra material such as advertisements or news items. The host system 110 may also selectively remove material from the partner system resources 426 to produce suitable discriminated resources. For example, the host system 110 may remove an advertisement for a competing service that was received as part of the non-discriminated partner system resources.

After the host system 110 has created or modified the resources to be suitably discriminated, the resources are transmitted to the user 420. A schematic diagram depicting the flow of data and resources in this embodiment is depicted in FIG. 3b, which is described elsewhere herein.

Although the present invention has been described in terms of certain preferred embodiments, it is not limited to these embodiments. Alternative embodiments and modifications which would still be encompassed by the invention may be made by those skilled in the art, particularly in light of the foregoing teachings. Therefore, the following claims are intended to cover any alternative embodiments, modifications or equivalents which may be within the spirit and scope of the invention as defined by the claims.

We claim:

1. A method of providing a discriminated partner system resource to a user of a host system during a single login session, wherein the partner system communicates over a network and comprises downloadable executable code stored on a non-transitory computer-readable medium configured to perform the steps of:
   receiving a request to access a partner system resource through a host system;
   receiving host system data;
   identifying the host system;
   receiving user data;
   identifying the user based at least in part on the user data;
   identifying host system data of the user; and
   providing the discriminated partner system resource to the user;
   wherein providing the discriminated partner system resource comprises:
      classifying the host system,
      identifying a non-conflicting partner system resource that does not conflict with the host system's classification, and
      incorporating the non-conflicting partner system resource into a standard partner system resource to create the discriminated partner system resource.

2. The method of claim 1 wherein receiving host system data comprises receiving host system data from the host system.

3. The method of claim 1 wherein identifying said host system comprises identifying the host system based at least in part on the host system data.

4. The method of claim 1 wherein receiving user data comprises receiving user data from the host system.

5. The method of claim 1 further comprising authenticating the request to access the partner system resource.

6. The method of claim 1 further comprising transmitting the discriminated partner system resource to at least one of the host system and the user.

7. The method of claim 1 wherein the partner system resource and the host resource are accessible through a web browser.

8. The method of claim 1 wherein the user data comprises a user name and a user password.

9. The method of claim 1 wherein the user data comprises authentication data provided by a single sign on authentication system.

10. The method of claim 1, wherein the host system comprises a financial service provider system with which a user of the host system has one or more financial accounts.

11. The method of claim 1, wherein the partner system resource comprises financial information.

12. The method of claim 1, wherein the partner system resource comprises incentive reward information.

13. A system for providing a discriminated partner system resource to a user of a host's system resources during a single login session comprising:
   a partner system for providing a partner system resource through a computer network, wherein the partner system comprises downloadable executable code stored on a non-transitory computer-readable medium configured to:
   receive a request to access partner system resource through said host system;
   receive host system data;
   identify a host system;
   receive user data;
   identify the user based at least in part on the user data; and
   provide the discriminated partner system resource to the user;
      wherein providing the discriminated partner system resource comprises:
         classifying the host system,
         identifying a non-conflicting partner system resource that does not conflict with the host system's classification, and
         incorporating the non-conflicting partner system resource into a standard partner system resource to create the discriminated partner system resource.

14. The system of claim 13 wherein the set of instructions for receiving host system data comprises instructions for receiving host system data from the host system.

15. The system of claim 13 wherein the set of instructions for identifying a host system comprises instructions for identifying the host system based at least in part on the host system data.

16. The system of claim 13 wherein the set of instructions for receiving user data comprises instructions for receiving user data from the host system.

17. The system of claim 13 further comprising a set of instructions for authenticating the request to access the partner system resource.

18. The system of claim 13 further comprising a set of instructions for transmitting the discriminated partner system resource to at least one of the host system and the user.

19. The system of claim 13 wherein the partner system and the host system are accessible through a web browser.

20. The system of claim 13 wherein the user data comprises a user name and a user password.

21. The system of claim 13 wherein the user data comprises authentication data provided by a single sign on authentication system.

22. The system of claim 13, wherein the host system comprises a financial service provider system with which a user of the host system has one or more financial accounts.

23. The system of claim 13, wherein the partner system resource comprises financial information.

24. The system of claim 13, wherein the partner system resource comprises incentive reward information.

* * * * *